United States Patent [19]

Kagawa et al.

[11] Patent Number: 5,063,526
[45] Date of Patent: Nov. 5, 1991

[54] BIT MAP ROTATION PROCESSOR

[75] Inventors: Koichi Kagawa, Fuchu, Japan; Chung-Li Yu, San Jose, Calif.; Shinkyo Kaku, San Jose, Calif.; Vinod Menon, Sunnyvale, Calif.

[73] Assignee: Advanced Micro Devices, Inc., Sunnyvale, Calif.

[21] Appl. No.: 57,850

[22] Filed: Jun. 3, 1987

[51] Int. Cl.[5] .................. G06F 15/40; G06F 15/62
[52] U.S. Cl. ............................ 395/155; 340/735; 382/46
[58] Field of Search ............... 364/518, 521, 522; 340/727, 735, 799; 382/46, 47

[56] References Cited

U.S. PATENT DOCUMENTS

| 3,378,819 | 4/1968 | Hannicq et al. | 340/172.5 |
|---|---|---|---|
| 4,168,488 | 9/1979 | Evans | 340/146.3 H |
| 4,271,476 | 6/1981 | Lotspiech | 364/515 |
| 4,312,045 | 1/1982 | Jean et al. | 365/900 |
| 4,554,638 | 11/1985 | Iida | 364/521 |
| 4,593,407 | 6/1986 | Konishi et al. | 382/46 |
| 4,635,212 | 1/1987 | Hatazawa | 364/518 |
| 4,703,515 | 10/1987 | Baroody, Jr. | 382/46 |
| 4,706,205 | 11/1987 | Akai et al. | 365/518 |
| 4,716,533 | 12/1987 | Ohmori | 364/518 |
| 4,729,107 | 3/1988 | Hasegawa et al. | 364/519 |
| 4,745,560 | 5/1988 | Decker et al. | 364/519 |

OTHER PUBLICATIONS

Gold, D. E., "Shift Register Implemented Image Rotator/Transposer", IBM Technical Disclosure Bulletin, vol. 12, No. 10, 3/75, pp. 3026-3028.
Gold et al., "Shift Register System for Image Orientation", IBM Technical Disclosure Bulletin, vol. 18, No. 8, 1/76, pp. 2633-2639.

Primary Examiner—Dale M. Shaw
Assistant Examiner—Phu K. Nguyen
Attorney, Agent, or Firm—Fliesler, Dubb, Meyer & Lovejoy

[57] ABSTRACT

An apparatus for rotating bit-mapped data includes a specially designed data array (9) that includes a normal port (10) for accessing horizontal words of data and a rotated port (15) for accessing vertical words of data. In addition, address generating logic (6) is provided that automatically generates proper address seqences for accessing the normal words or the vertical words as appropriate during a rotation operation. The apparatus is cascadable (FIG. 29) to provide effectively any size data array.

23 Claims, 18 Drawing Sheets

FIG. 5A

FIG. 6A     FIG. 6B
FIG. 6C     FIG. 6D

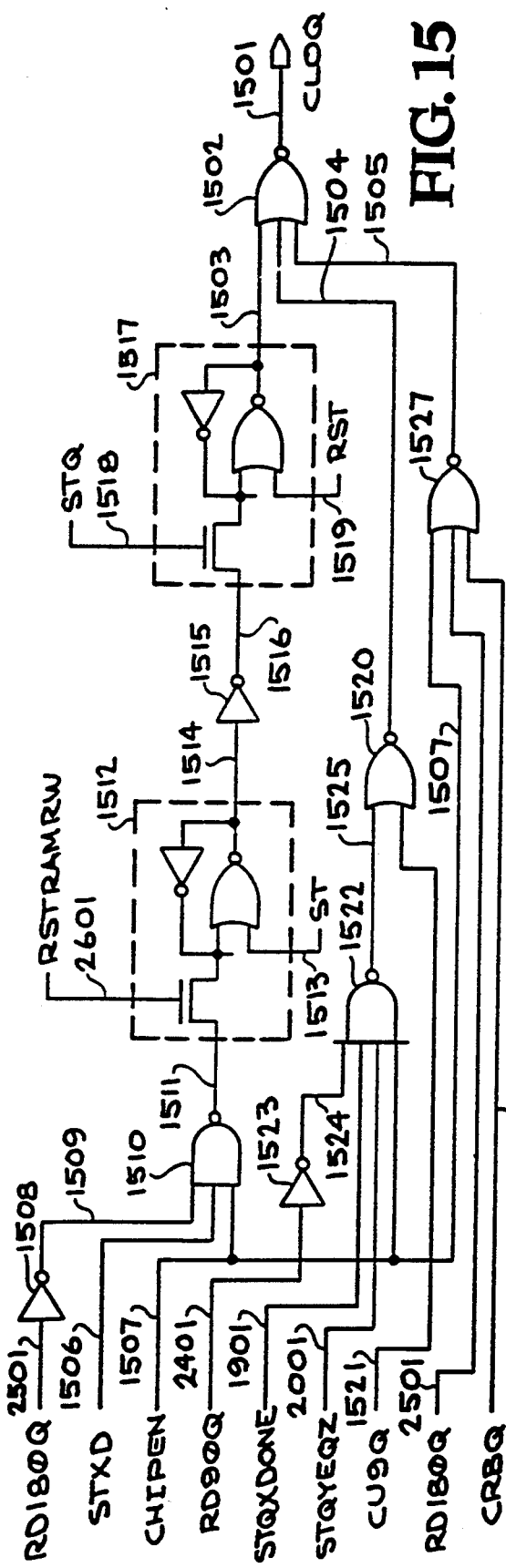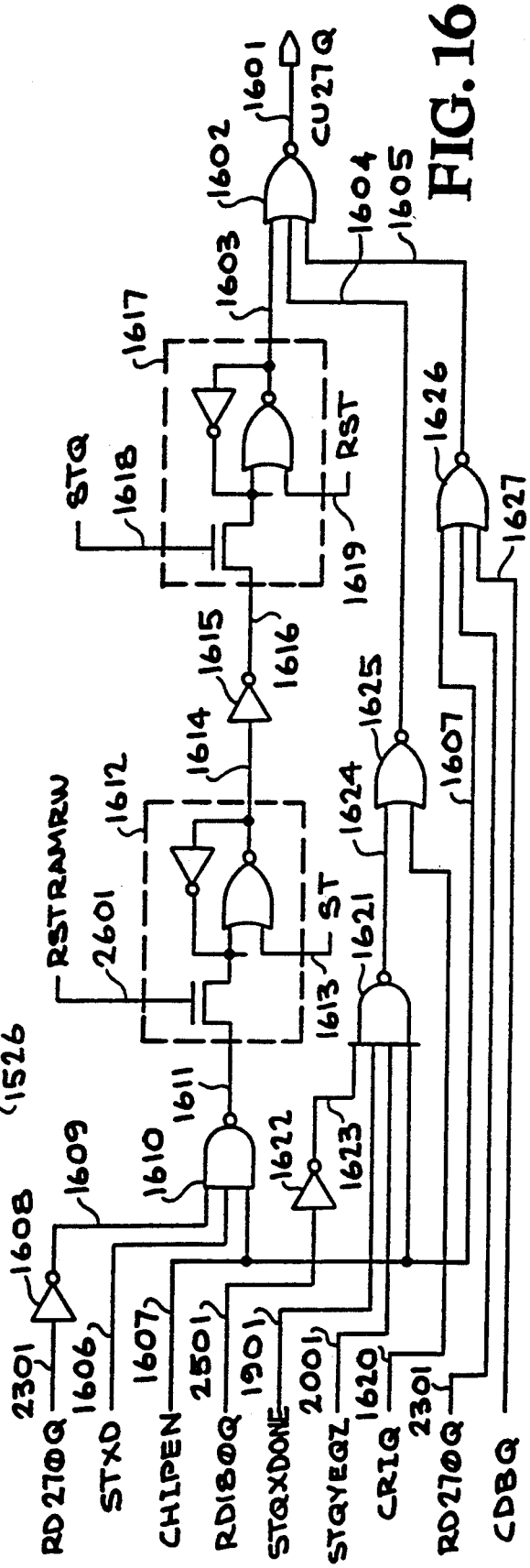

BIT MAP ROTATION PROCESSOR

BACKGROUND OF THE INVENTION

1. Field of the Invention

The present invention relates to printing, displaying and other processes involving bit-map images; and more particularly to a system for rotating images prior to printing or displaying on a raster scanning device.

2. Description of Related Art

Data used to create images on raster scanning devices, such as dot matrix printers, laser printers, cathode ray tube displays and other types of digital display systems, is typically stored in a bit-map format. The bit-map is organized so that as data is read from the bit-map, it is presented to the printer or other display as a sequence of data words corresponding to each pixel to be printed or displayed. Typically, the data in the bit-map is organized in an address space so that an automatic address generating system can be used to transfer the data from the storage device to the printer or display. Because of the organization of the data, the orientation of images represented by the data is defined when it is written into the bit-map.

In addition, for some systems, bit-map images created by combining smaller bit-maps of individual images or characters as a given screen or page of printing is being processed. For instance, individual letters are often addressed from a bank of character bit-maps, called a font memory, that are all oriented to be printed with a normal or vertical orientation on the page.

Occasionally, it is desirable to rotate images which have been stored in bit-maps, such as the bank of character bit-maps mentioned above. By rotating the images, a page can be printed on which the letters appear rotated to the normal or vertical position.

In addition, as data processing systems become more complicated and include different types of printers or other display equipment, it is possible that the orientation of data in bit-maps will be required to be changed depending on the particular printer or display device being used. For example, a first printer may scan the bit-map data in a horizontal line direction while a second printer may have a vertical scan format. In order to adapt the bit-map to a vertical scan format, the organization of the bit-map requires alteration.

While systems for rotating the scan direction of images are known, such systems are impractical or impossible to be used with large bit-map images where substantial amounts of data must be stored and operated upon.

U.S. Pat. No. 4,271,476 issued to Lotspiech, describes one method for rotating the scan format of bit-mapped images. However, the Lotspiech method is relatively slow, requiring steps of reading each data word in its original scan format, transferring only selected bit positions within each word to a temporary storage, and reconstituting the rotated bit-map scan format based on the selected bit positions. Prior art systems for rotating bit map images have been unable satisfactorily to rotate bit-mapped images rapidly and automatically without intensive processing by a controlling computer.

SUMMARY OF THE INVENTION

The present invention provides an apparatus for rapidly rotating bit-mapped images in response to orientation control signals from a host system. The images are rotated rapidly and automatically, and can be of any size.

Accordingly, the present invention provides an apparatus receiving input bit-map data for supplying output bit-map data that comprises the unique storing means and address generating means. The storing means is connected to receive the input bit-map data and array addresses and stores the bit-map data in an array of data locations, each data location for a unit of the bit-map data. The storing means is accessible in response to array addresses in a normal mode and a rotated mode. The normal mode accesses normal sets of data locations in response to the array addresses and the rotated mode accesses rotated sets of data locations in response to the array addresses. The normal sets include a word of bit-map data oriented for a normal printing or display and the rotated sets provide the same bit-map data in a form adapted to be rotated when displayed. The address generating means is responsive to mode control signals to generate sequences of array addresses for the storing means. The sequences are generated in a normal mode and a rotated mode; the normal mode resulting in the generation of a sequence of array addresses for accessing normal sets of data locations in an order suited to the normal orientation of the raster scanner and the rotated mode generating sequences of array addresses for accessing rotated sets of data locations in an order suited to displaying the data in a rotated orientation. The apparatus further includes a control means providing an interface between an external controller and the storing means and address generating means.

In one embodiment, the normal mode results in a normal orientation for the bit-map image on the screen and the rotated mode provides for an orientation orthogonal to the normal orientation. Thus, the normal mode corresponds to a zero degree rotation and the rotated mode corresponds to a ninety degree rotation.

In another aspect, the present invention provides for producing a 180 degree rotation and a 270 degree rotation in addition to the 0 and 90 degree rotations mentioned above. In this embodiment, the address generating means operates in an opposite normal mode in which sequences of addresses are generated for accessing the normal sets in a reverse order resulting in a 180 degree rotation and the opposite rotated mode in which the rotated sets of data locations are accessed in a reverse order resulting in a 270 degree rotation. In addition, in this aspect, the invention includes a means for transposing the units of data from accessed sets of data that are supplied by the storing means in the opposite normal mode and the opposite rotated mode.

Additional features of the invention are based on the control interface. In particular, a means is provided for controlling the address generating means in response to logical image size of data in the storing means, regardless of the actual size of the storing means array itself. In this aspect, the control means includes a register storing parameters identifying the size of an image in the storing means to be rotated. Contents of this register are utilized by the address generating means to map the sequence of addresses generated to match the specified image size in any operating mode.

Further, the control means provides an interface for cascading a number of copies of the invention to increase effectively the size of the array of data locations in the storing means beyond the practical limit for a given integrated circuit. Thus, according to this interface, the invention can be cascaded in any numbers in both the horizontal and vertical directions through unique means for passing tokens among the interconnected rotating apparatus. The combination of the cascading feature with the logical image size feature provides for rotation of bit-map images of effectively any size.

Additional features of the present invention can be seen by a study of the specification and drawings that follow. In particular, the present invention provides for "clipping" as defined below and for automatic data masking at the output of the storing means.

BRIEF DESCRIPTION OF THE DRAWINGS

FIGS. 5A and 5B are charts showing the organization of the storage array.

FIGS. 6A-6D are tables illustrating the sequences of addresses used for accessing the data array for 0 degree reads and writes, 90 degree reads, 180 degree reads and 270 degree reads respectively.

FIGS. 13-28 are logic diagrams making up the cascade control logic, of FIG. 2A.

DESCRIPTION OF THE PREFERRED EMBODIMENT

Figure 1:
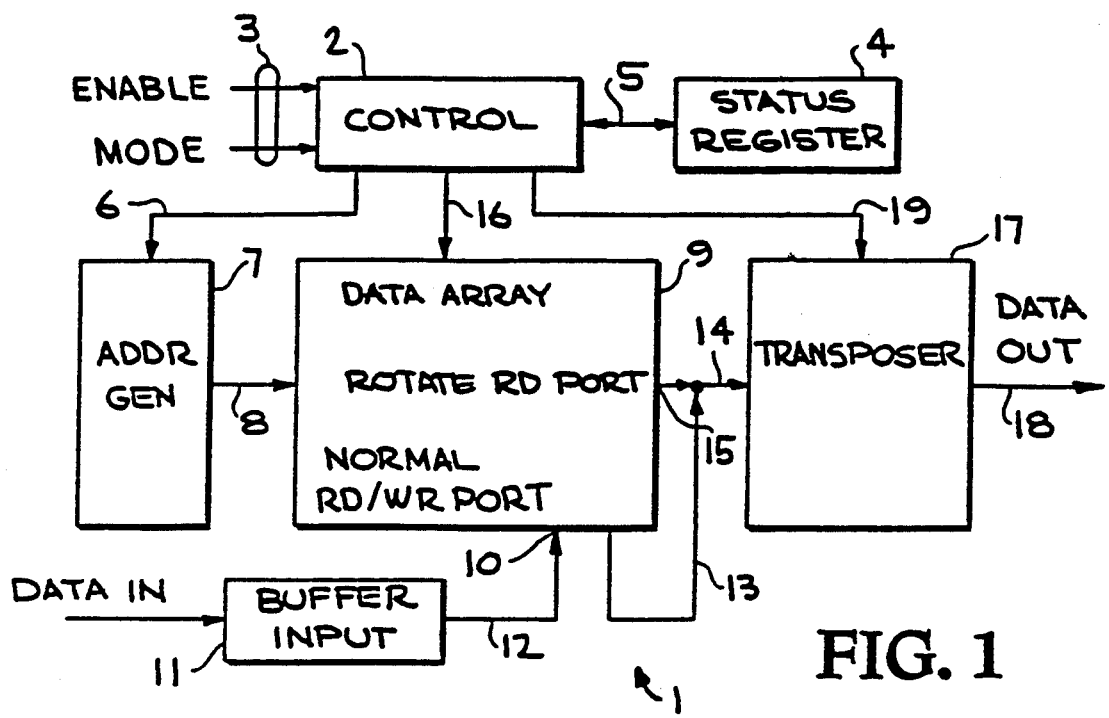
FIG. 1 is an overview block diagram of the present invention.
Figure 2C:
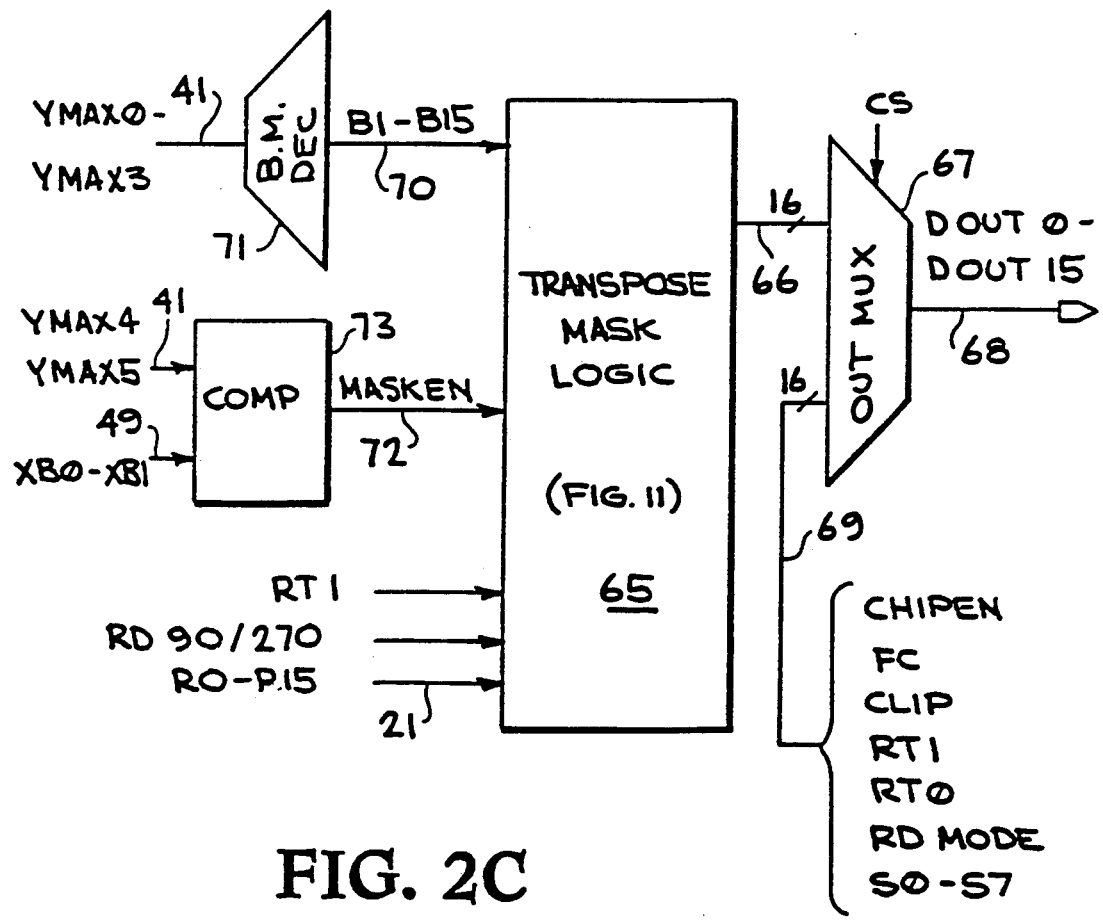
FIGS. 2A-2C are a detailed block diagram of a preferred embodiment of the present invention.
Figure 2A:
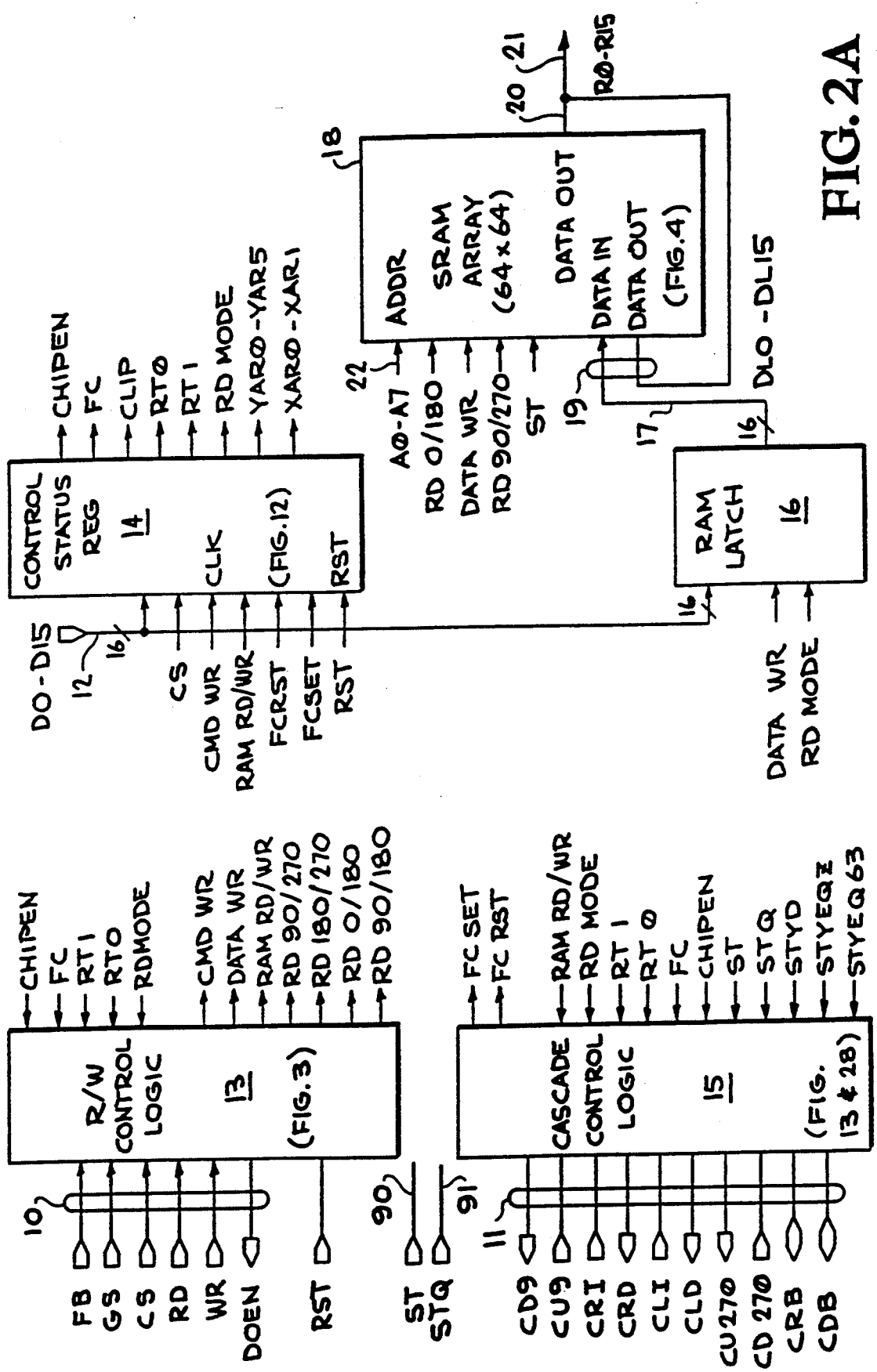
Figure 2B:
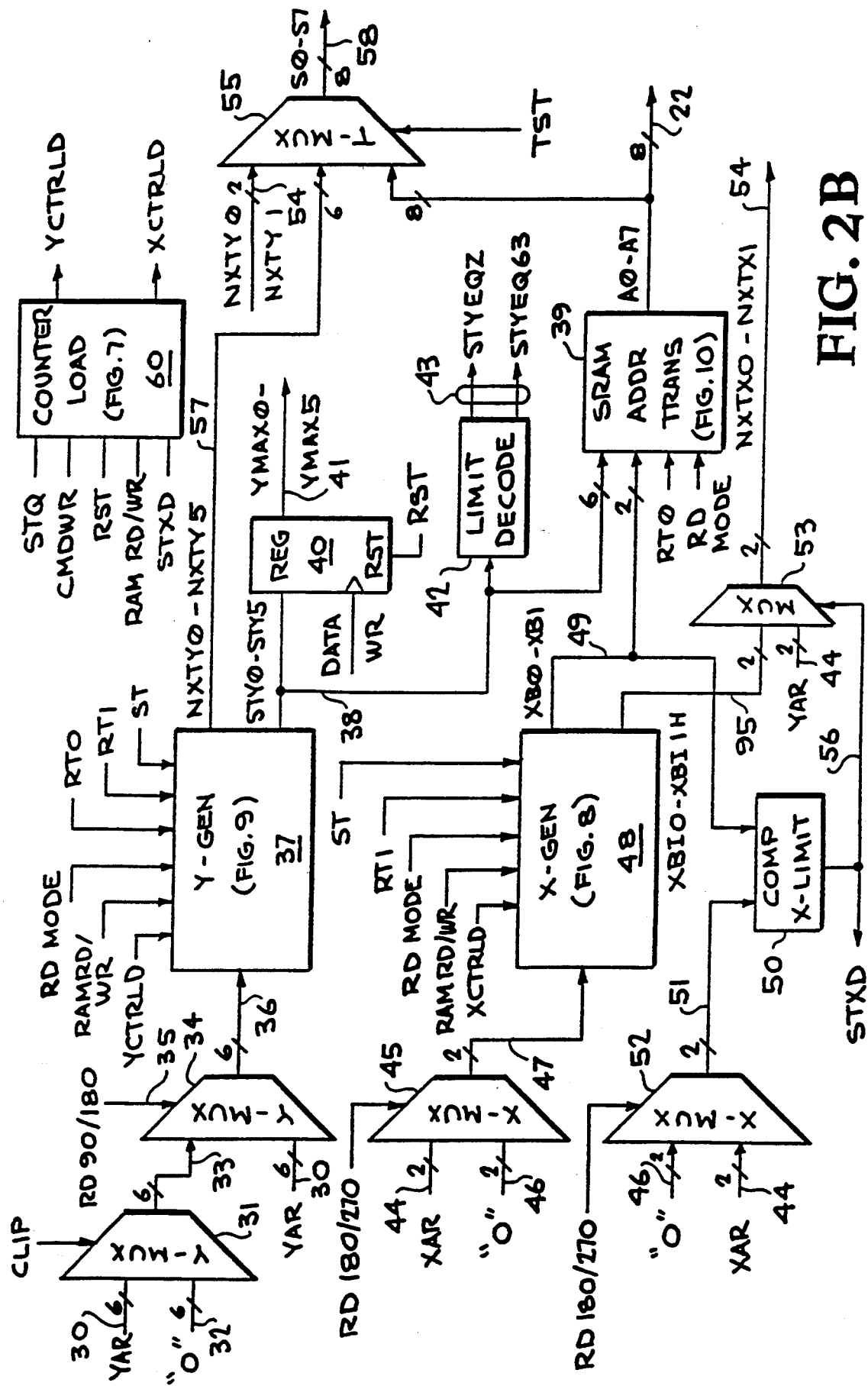

With reference to the figures, a detailed description of the preferred embodiment of the present invention is provided. FIG. 1 provides an overview of the invention. FIGS. 2A-2C are block diagrams illustrating the preferred embodiment. The remaining figures describe details of the preferred embodiment.

I. Overview

FIG. 1 is an overview block diagram of a rotation processor 1 according to the present invention. The rotation processor 1 includes control means 2 connected to receive control signals across lines 3, such as an enable and mode control signal. The control means 2 generates status information which is stored in a status register 4 across lines 5. In addition, in response to the control signals on lines 3 and status information in the register 4, the control means 2 generates address control signals across line 6 to an address generator 7. The address generator 7 supplies sequences of addresses across lines 8 to a data array 9. The data array includes a normal read/write port 10. An input data buffer 11 is connected across line 12 to the normal read/write port 10 and the normal read/write port 10 is connected across line 13 to an output bus 14. In addition, the data array 9 includes a rotate read port 15 which is connected to the output bus 14. The control means 2 generates storage control signals across line 16 for supply to the data array 9.

The output data bus 14 is connected to a transposed 17 which supplies the output data across lines 18. The controller supplies control signals across lines 19 to the transposed 17.

In operation, in response to the control signals on lines 3, data is supplied through the data input buffer 11 to the data array 9 through the normal write port and stored. In order to read data out with the data array, the control signals 3 specify a rotation mode, either 0, 90, 180 or 270 degrees in the preferred embodiment. The address generation logic 7 then generates an appropriate sequence of addresses to supply the data in the selected mode. In the 0 and 180 degree modes, data is supplied through the normal read/write port across line 13 to the output bus 14; while in the 90 or 270 degree modes, the data is supplied to the output bus 14 from the rotated read port 15. The data is supplied in sets, called words, 16 bits long in the preferred embodiment. In the 180 and 270 degree rotation modes, a transposed 17 transposes the bits in each of the output data words such that the bit position 15 is transposed to bit position 0, bit position 14 is transposed to bit position 1, bit position 13 is transposed with bit position 2 and so on, until bit position 8 is transposed with bit position 7. In the 0 or 90 degree modes, the transposed is disabled and the data is supplied on the data output line 18.

The apparatus 1 operates fully automatically, with the only user accessible resources being available through the controller 2, including the status register 4. The interface through the controller is easily managed with a general purpose central processing unit such as that controlling a printer or other raster scanning device.

II. Integrated Circuit Implementation A. ORP Architecture

FIGS. 2A-2C are a block diagram of an implementation of the present invention designed for an integrated circuit. The integrated circuit is known as the orthogonal rotation processor (ORP). There are two independent interfaces connecting the ORP to the outside. The first interface 10 is called the control interface and is adapted to communicating with a central processing unit for the printer or other device adapted to display or store bit-map images. For the purposes of this description we will assume that the ORP is being used with a printer. The second interface 11 is called a cascade interface, through which multiple ORPs can be connected together easily with minimal external hardware. In addition, the control interface 10 utilizes 16 data lines 12. The ST signal on line 90 and the STQ signal on line 91 are provided as clocks. Remaining lines (not shown) are used for power and ground. The following is a summary of the control interface signals.

D0-D15 (DATA, INPUT/OUTPUT,3-STATE)

These 16-bit data lines 12, are used for data transfer among the ORP, an external CPU and an external memory. High on the bus corresponds to "1" and Low corresponds to "0". D0 is the least significant bit and D15 is the most significant bit for data.

GS (GROUP SELECT, INPUT)

In normal read/write operation mode, this input has to be driven low whenever the CPU wants to access the data array of the ORP. The ORP data space should be assigned to a specific address on the image memory space of the CPU. This input will be driven low by an external address decode logic under control of the CPU. In cascade configuration, this input should be connected to the same address decode line in all the cascaded ORPs.

RD (READ, INPUT)

This input is driven low by CPU when read of the ORP internal memory or the control status register is required. In normal read mode, while RD input is low, D0-15 will be driven with valid data. After the RD input returns to its high state, D0-15 will float. In the special fly-by write mode described below, this RD input is used as a write strobe internally. In this mode ORP will use the rising edge of RD to write the data into the specified memory address.

WR (WRITE/INPUT)

The CPU will drive the WR line low then the ORP internal memory or the control status register is to be loaded with data. In normal write mode, ORP will use the rising edge of WR to write the data into the specified internal memory address. While WR is low D0-D15 must be driven externally with valid data. In Fly-By read mode, this WR input is used as a read strobe internally. In this mode, while WR input is low, D0-D15 will be driven with valid data by the ORP.

CS (CONTROL STATUS, INPUT)

This input must be driven low whenever the CPU accesses the control status register, CSR, of the ORP. The CSR of the ORP is assigned to a specific address on the CPU's memory space. This input will be driven low by an external address decoder.

ST (START, INPUT)

This input will be driven high by the CPU when the read/write operation will start. This input should be connected with the signal of the CPU which indicates the beginning of the read/write cycle.

RST (RESET, INPUT)

This is an a synchronous active low input which initializes the ORP. This input must be driven low for at least 200 nanoseconds. After the initialization, the ORP will remain in the idle state until an ORP access is made. The control status register will be cleared to "0" by RST input.

FB (FLY-BY, INPUT)

In fly-by read/write operation mode, this input must be driven low whenever the CPU wants to transfer data between the data array of the ORP and the font memory. In fly-by mode, the CPU will access the font memory space so no address decode is available for the GS signal, so only RD or WR input will be driven low by the CPU. The ORP will perform a read/write operation according to the WR/RD input only when FB input is low. To control the fly-by operation, the user must supply this FB signal by external logic.

The control signals FB, GS, CS, RD and WR are connected to a read/write control logic 13. The read/write control logic provides an interface for the ORP with the host CPU and generates control signals for the address generation logic shown in FIG. 2B. Other inputs to the read/write control logic 13 include data from the control status register 14, including the signal CHIPEN, FC, RT1, RT0 and RDMODE. The outputs of the read/write control logic 13 include the control signals CMDWR, DATAWR, RAMRDWR, RD90/270, RD180/270, RD90/180 and RD0/180. As mentioned above, these control signals are used by the storage means, the address generation logic and the output transposed and masker as described below.

The ORP shown in FIGS. 2A-2C also includes a status register 14 corresponding to the register 4 of FIG. 1. The control status register 14 is connected to the input data bus 12 and to receive control signals from the read/write control logic 13 and the cascade control logic 15. The control signals received from the read/write control logic 13 include signal CMDWR and RAMRDWR. The signals received from the cascade control logic 15 include FCRST and FCSET. Further, the control status register 14 receives the CS signal and the RST signal which are supplied to the chip externally. In the preferred embodiment, the control status register 14 is a 16-bit register with two reserved locations, making for 14 active data locations. The control status register CSR 14 specifies all commands to the ORP. The data in the CSR 14 specifies the horizontal size, vertical size, read/write mode, angle of rotation, chip enable and the cascade token state.

In the preferred embodiment, the signals XAR0-XAR1 specifies the logical horizontal size of the image in the data array on word boundaries. The signals YAR0-YAR5 specify the logical vertical size of the image in the data array on bit boundaries. Together the XAR and YAR signals make up the logical image size specification described in detail below.

The RT0 and RT1 bits specify the angle of rotation for a read operation. The CLIP bit indicates whether clipping, as described below, has or has not occurred. The RDMODE bit specifies whether a read or write operation is occurring. The CHIPEN bit is an enable indicator and the FC bit specifies which ORP is accessible in a cascade configuration. More details of the operation of these signals is provided below.

The cascade control logic 15 is connected to the cascade interface 11. Any number of ORPs can be cascaded for both horizontal and vertical expansion of the data array. In the cascade configuration, all CPU interface signals, except CS, are connected, so chip selection is performed by cascade control logic 15 on board the ORP chip. As mentioned above, the cascade interface includes 10 cascade control signals, each of which is described below.

CLO (CASCADE LEFT OUT, OUTPUT)

This signal controls horizontal direction FC signal propagation. CLO signal must be connected with the CRI signal from an ORP to the left. In 90 degree read operation, ORP will drive CLO signal low when the whole memory area which was assigned by the XAR/YAR signals has been read. In 180 degree read operation, ORP will drive CLO low when one horizontal row of data words has been read. The token FC of the data transmission will move into the left ORP.

CLI (CASCADE LEFT IN, INPUT)

This signal controls horizontal direction FC signal propagation. CLI signal must be connected with the left ORP CRO signal. In write operation, 0 degree read operation and 70 degree read operation, CLI input of the token receiving ORP is driven low by the left ORP to move the FC token of data transmission.

CRO (CASCADE RIGHT OUT, OUTPUT)

This signal controls horizontal direction FC signal propagation. CRO signal must be connected with the right ORP CLI signal. In write operation, 0 degree read operation and 270 degree read operation, ORP will drive the CRO signal low to move the token of the data transmission into the ORP to its right.

CRI (CASCADE RIGHT OUT, OUTPUT)

This signal controls horizontal direction FC signal propagation. CRI signal must be connected with the CLI signal of the ORP to the right. In 90 and 180 degree read operation, CRI input of the token receiving ORP is driven low by the right ORP when the token of the data transmission is to be moved.

CU9 (CASCADE UP 90, INPUT)

This signal controls vertical direction FC signal propagation. CU9 signal must be connected with the up ORP CD9 signal. CU9 input of the token receiving ORP is driven low by the ORP above it to move the token of data transmission in the 90 degree read and 0 degree read and write mode.

CD9 (CASCADE DOWN 90, OUTPUT)

This signal controls vertical direction FC signal propagation. CD9 signal must be connected with the down ORP CU9 signal. The ORP will drive the CD9 signal low to move the token of the data transmission down in the 90 degree read, 0 degree read and write modes.

CU27 (CASCADE UP 270, OUTPUT)

This signal controls vertical direction FC signal propagation. CU27 signal must be connected with the up ORP CD27 signal. The ORP will drive the CU27 signal low to move the token of the data transmission up in the 180 degree and 270 degree read modes.

CD27 (CASCADE DOWN 270, INPUT)

This signal controls vertical direction FC signal propagation. CD27 signal must be connected with the down ORP CU27 signal. CD27 input of the token receiving ORP is driven low by the down ORP in 270 degree and 180 degree read modes to move the token of data transmission.

CRB (CASCADE RIGHT BYPASS, INPUT/OUTPUT, OPEN DRAIN)

This signal controls horizontal direction FC signal propagation. CRB is defined as an output in write operation and 0 degree read operation. If the ORP is disabled (control status register CHIPEN=0), CLI drives the CRB output, so the CRB signal goes low immediately after the CLI signal is driven low. CRB is defined as an input in 180 degree read operation. If the ORP is disabled, CRB input is internally connected to the CLO output. CRB input is ignored in an enabled ORP (CHIPEN =1). CRB is an open drain output. The CRB signals of all ORPs which are cascaded horizontally should be connected together with a pull-up resistor.

CDB (CASCADE DOWN BYPASS, INPUT/OUTPUT, OPEN DRAIN)

This signal controls vertical direction signal propagation. CDB is defined as an output in 90 degree read operation. If the ORP is disabled (control status register CHIPEN=0), CU9 drives the CDB signal, so that the CDB signal goes low immediately after the CU9 input is driven low. CDB is defined as an input in the 270 degree read operation. If the ORP is disabled, CDB is internally connected to the CU27 output. CDB input is ignored in an enabled ORP (CHIPEN =1). CDB is an open drain output. The CDB signals of all ORPs which are cascaded vertically should be connected together with a pull-up resistor.

The cascade control logic 15 generates the FCSET and FCRST signals internally for supply to the control status register 14. In addition, it receives as internal inputs, the RAMRDWR, RDMODE, RT1, RT0, FC, CHIPEN, ST, STQ, STXD, STYEQZ and STYEQ63 signals from the read/write control logic 13, the control status register 14, and other logic included within the ORP.

The data is supplied as mentioned above, across line 12 to the ORP. Line 12 is connected to a RAM latch 16 which latches the input data in response to the DATAWR and RDMODE signals as supplied from the control status register 14 and read/write control logic 13, respectively. The output of the RAM latch 16 is supplied on line 17 as the data input to the storage array 18.

In the preferred embodiment, the storage array 18 is a 64×64 CMOS SRAM device which includes a normal read/write port 19 and a rotated read port 20. The output of the read/write port 19 and the read port 20 are connected to bus 21 to supply the signals R0-R15. The SRAM array 18 receives sequences of addresses A0-A7 across line 22 as generated by the address generating logic shown in FIG. 2B. In addition to ST, control signals RD0/180, DATAWR, and RD90/270 are supplied from the read/write control logic 13.

The ST and RST signals are supplied externally to the chip as discussed above and perform timing control and initialization functions.

Address bits A0-A7 on line 22 are generated by the addressing logic shown in FIG. 2B. The RAM data out bus 21 supplying bits R0-R15 are supplied to the output logic shown in FIG. 2C.

FIG. 2B illustrates the addressing logic for the preferred embodiment which generates the address bits A0-A7 on line 22. The mode of addressing the array is controlled by the control bits RD90/180, DATAWR, ID180/270, CLIP and ST.

The addressing logic results in the generation of address sequences which are supplied to the SRAM array 18 to address the bit-map images in a selected rotated mode. The start and stop positions of the addresses are defined by the logical image size specified in the XAR and YAR controls of the control status register 14.

The YAR address is supplied on line 30 as an input to a first Y multiplexer 31. The second input to the first Y multiplexer 31 is a 6-bit signal equivalent to all zeros on line 32. The first Y multiplexer 31 is controlled by the CLIP control bit from the command status register as used in the clipping operation as discussed below. When no clipping is occurring, the all zeros input is selected and supplied on line 32. The output is supplied on line 33. The output on line 33 is supplied to a second Y multiplexer 34. The second input to the second Y multiplexer 34 is the YAR signal on line 30. During a 270 degree read (any mode other than 90 or 180 degree read), as indicated by the RI;90/180 signal on line 35, the second Y multiplexer 34 selects the zeros input from line 33 to supply its output on line 36. When a 90 or 180 degree rotation is being accomplished, the YAR value from line 30 is supplied through the second Y multiplexer 34 to line 36. Line 36 is supplied as an input to the Y address generating logic 37. The output of the Y address generating logic 37 is a 6-bit code STY0-STY5 on line 38 which is supplied to RAM address translating logic 39. It is also supplied to a Y-maximum register 40 which is clocked by the DATAWR signal and reset to all zeroes by the RST signal. The output of the YMAX register 40 is a 6-bit code YMAX0-YMAX5 on line 41 which is supplied to a bit masking decoder 71 described with reference to FIG. 2C. The STY0-STY5 signal on line 38 is also supplied to a limit decoder 42 which generates control signals STYEQZ and STYEQ63. The STYEQZ signal is generated when the input is all zeros and the STYEQ63 signal is generated when the input is all ones. These control signals are supplied to the cascade logic as described below, on lines 43.

The XAR code from the control status register 14 is supplied on line 44 as a first input to a X-multiplexer 45. The second input to the X-multiplexer 45 is a 2-bit code of all zeros on line 46. The output of the X-multiplexer 45 is supplied on line 47 as an input to the X-address generating logic 48. The X-multiplexer 45 is controlled by the RD180/270 signal, such that when a 0 write or 90 degree read is being performed, the zero input is selected and when a 180 or 270 degree read is being performed, the XAR value is selected. The output of the X generating logic is a 2-bit code on line 49, XB0-XB1, which is supplied as an input to the RAM address translator 39.

The XB0 and XB1 signals on line 49 are also supplied as an input to the X limit comparator 50. The second input to the X limit comparator is a signal on line 51 which is supplied from X multiplexer 52. X multiplexer 52 receives as inputs the XAR signal on line 44 and all zeros on line 46. During a 180 or 270 degree read, the end address of zero is selected through the second X multiplexer 52 to line 51. During the 90 or 0 degree read, the value selected for the end is a XAR. In the X limit comparator 50, the output of the X address generator on line 49 is continuously compared to the limit on line 51. When it reaches the limit, the STXD signal is generated and supplied to the cascade logic.

The X address generator also supplies on line 95 an incremented address signal XBI0-XBI1 which is supplied to a next X multiplexer 53. The second input to the next X multiplexer 53 is the XAR value on line 44. The multiplexer 53 supplies a next X address on line 54 which is supplied to the test output multiplexer 55 as described below. The multiplexer 53 is controlled by the STXD signal on line 56 to select the XB0-XB1 values on line 49 until the limit is reached at which time it switches to select the XAR value from line 44.

The Y address generator 37 also generates a NXTY0-NXTY5 code on line 57 which is the next address to be generated. The NXTY0 through NXTY5 code is supplied in combination with the NXTX0 and NXTX1 codes on line 54 as a first input to test output multiplexer 55. The second input to the test output multiplexer 55 is the actual output on line 22 of the RAM address translating logic 39. During testing procedures, test multiplexer 55 is controlled to supply outputs S0 through S7 on line 58 which are selectable in the output multiplexer described with reference to FIG. 2C.

The X address generating logic 48 and the Y address generating logic 37 operate under control of signals generated by control logic on the ORP. The Y address generating logic 37 is controlled by the signal ST, RT1, RT0, RDMODE, RAMRDWR and YCTRLD. The X address generating logic is controlled by the ST, RT1, RDMODE, RAMRDWR and XCTRLD signals. All of these signals are supplied by the control status register 14 or the read/write control logic 13 with the exception of the YCTRLD and the XCTRLD signals. These signals are generated by the counter load logic 60 in response to the STQ, CMDWR, RST, RAMRDWR and STXD signals. Both the Y and X address generating logic include counters. These signals YCTRLD and XCTRLD are the Y counter load and X counter load signals, respectively, which are used to initialize new address sequences.

The output logic of the ORP chip is diagrammed in FIG. 2C. As mentioned above, the data from the SRAM array is supplied on line 21 to the transpose/mask logic 65. The output of the transpose/mask logic 65 is supplied on line 66 to an output multiplexer 67. The output multiplexer 67 supplies the data out to the external bus on line 68. The output multiplexer 67 is controlled by the CS signal to select the contents of the control status register across line 69 when data is not being supplied. In addition to the control status register, the S0 through S7 bits are supplied through this output multiplexer as shown.

The transpose/mask logic 65 is controlled by mask bits B1 through B15 across line 70 from the output of the bit mask decoder 71. Basically the bit mask decoder 71 is a 4- to 16-bit decoder with bit 0 output being deleted because it is a trivial case. The operation of the bit mask is described I0 below. Other inputs to the transpose/mask logic 65 include the mask enable signal MASKEN on line 72. The MASKEN on line 72 is generated by the mask enable comparator 73 which compares bits YMAX4-YMAX5 with XB0-XB1 from lines 41 and 49, respectively. When the bits are equal, the MASKEN signal is generated on line 72. Other control signals to the transpose/mask logic 65 include the RT1 signal and the RD90/270 signals as described below.

The preceding is a description of the functional components of the ORP chip and how they are interconnected. The generation of array addresses, the operation of the array to provide output data and the output bit masking and transposing provide for rotation of bit-map images. The cascade control logic provides for cascading a plurality of ORP chips to increase effectively the size of the array that can be rotated. First, the implementation of the read/write control logic, the SRAM array, the address generation logic and the bit masking and transposing logic is described. Then, the function and implementation of the cascade control logic is presented. In the figures, a "Q" after the designation of a signal indicates that it is active low.

B. Read/Write Control Logic

Figure 3:
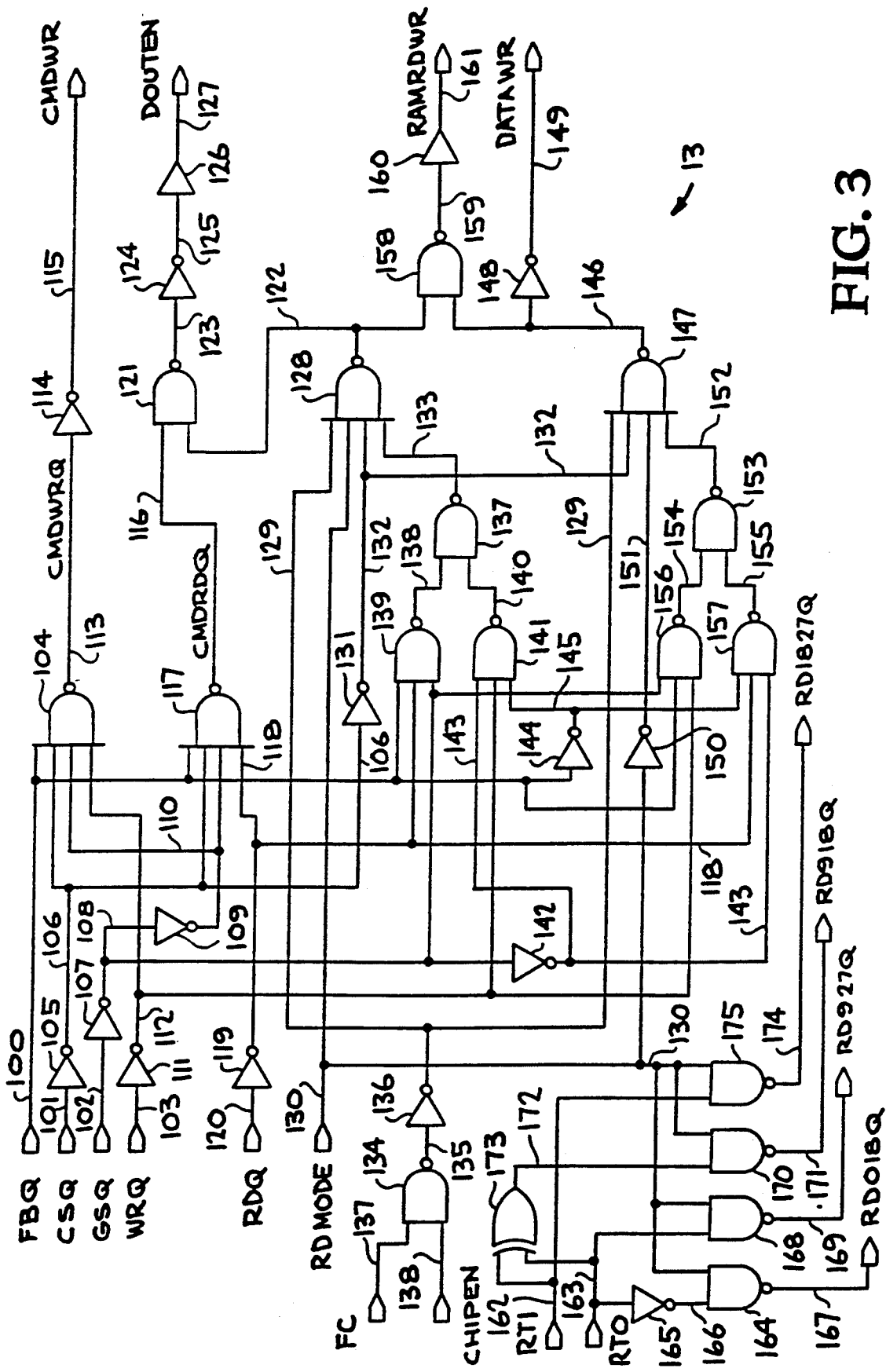
FIG. 3 is a logic diagram of the read/write control logic of FIG. 2A.

FIG. 3 is a logic diagram of the read/write control logic used to describe the generation of the read and write control signals used throughout the ORP chip for control purposes.

The inputs to the read/write control logic as shown in FIG. 3 include the FB signal, CS signal, GS signal, WR signal and RD signal, all of which are active low. In addition, the RDMODE signal, the FC signal, the CHIPEN signal, the RT1 signal and the RT0 signals, all of which are supplied from the control status register, are inputs. Each of the outputs will be described individually below.

The first output is the CMDWR signal which is generated when a write to the control status register is being carried out. The signal is based on the WR signal from line 103, the GS signal from line 102, the CS signal from line 101, and the FB signal from line 100. The FB signal is supplied directly as an input to NAND-gate 104. The CS signal on line 101 is supplied through inverter 105 to line 106 which is connected as a second input to NAND-gate 104. The GS signal is supplied through inverter 107 to line 108, from line 108 through inverter 109 to line 110 and from there as an input to NAND-gate 104. The WR signal is supplied through inverter 111 to line 112 and from there, directly to the NAND-gate 104. The output of NAND-gate 104 is low when all inputs are high. Thus, the output of NAND-gate 104 is asserted on line 113 when the CS and WR signals are asserted and FB and GS are not asserted. The signal on line 113 is supplied through an inverting buffer 114 to line 115 on which the CMDWR signal is supplied.

The next signal DOUTEN is asserted when data is being supplied on the output bus either from the control status register or the data array. A read of the control status register is indicated (CMDRD) on line 116 at the output of NAND-gate 117. The inputs to NAND-gate 117 include the FB signal on line 100, the CS signal on line 106, the GS signal on line 110, and the RD signal on line 118 which is supplied through inverter 119 from line 120. Accordingly, the signal on line 116 is asserted, active low when the CS signal is true and the RD signal is true but GS and FB are not asserted. The signal on line 116 is supplied as a first input to NAND-gate 121. The second input to NAND-gate 121 is supplied on line 122 which is asserted active low when a read of the SRAM is being asserted. Accordingly, the output of NAND-gate 121 on line 123 is supplied through inverter 124 to line 125 and through output buffer 126 as the DOUTEN signal on line 127.

The signal on line 122 indicating a SRAM read is generated at the output of NAND-gate 128. The inputs to NAND-gate 128 include the signal on line 129, the RDMODE signal on line 130, the CS signal from line 106 as supplied through inverter 131 to line 132, and the signal on line 133.

The signal on line 129 is supplied from the output of NAND-gate 134 on line 135 through inverter 136. The NAND-gate 134 asserts an active low signal when the FC signal from line 137 and the CHIPEN signal from line 138 from the control status register are asserted. The combination of the FC and CHIPEN signals form an enable signal at the output of NAND-gate 134.

The signal on line 133 is generated at the output of NAND-gate 137. The input to NAND-gate 137 includes the signal on line 138 from NAND-gate 139 and the signal on line 140 from NAND-gate 141. The inputs to NAND-gate 139 include the FB signal on line 100, the RD signal on line 118, and the GS signal from line 108. Thus, the output of NAND-gate 139 is asserted when the FB bit is rot asserted, indicating that it is not a fly-by mode and the RD and GS signals are asserted, enabling a read of SRAM data.

The signal on line 140 is supplied at the output of NAND-gate 141. Inputs to NAND-gate 141 include the GS signal from line 108 as supplied through inverter 142 to line 143, the WR signal from line 112 and the FB signal from line 100 as supplied through inverter 144 to line 145. Thus, the signal on line 140 is asserted when, in the fly-by mode, the GS signal is not asserted and the WR signal is asserted.

Accordingly, the signal on line 133 is asserted when a fly-by read or a normal read operation is being carried out. Therefore, the output of NAND-gate 128 is asserted when a SRAM read as indicated on line 133 is desired, the CS signal is not asserted as indicated on line 132, the RDMODE signal is true and the chip is enabled as indicated on line 129.

The next signal to be discussed is the DATAWR signal which is asserted when a write to the SRAM is being performed. The signal is asserted on line 146 through inverting buffer 148 to line 149. The signal on line 146 is supplied at the output of NAND-gate 147 whose inputs include the enable signal on line 129, the CS signal from line 132, the RDMODE signal form line 130 as supplied through inverter 150 to line 151, and the signal on line 152. The signal on line 152 is asserted at the output of NAND-gate 153 to indicate that a data write is desired. Inputs to NAND-gate 153 include signals on lines 154 and 155. The signal on line 154 is supplied at the output of NAND-gate 156. The inputs to NAND-gate 156 include the GS signal on line 108, the FB signal from line 100, and the WR signal from line 112. Accordingly, the signal on line 154 is asserted when the fly-by control is not asserted, the GS signal is asserted and the WR signal is asserted indicating a normal SRAM read operation.

The signal on line 155 is generated at the output of NAND-gate 157. The inputs to NAND-gate 157 include the FB signal on line 145, the RD signal from line 118 and the GS signal from line 143. The output of NAND-gate 157 on line 155 is asserted when, in the fly-by mode, the RD signal is asserted and the GS signal is not asserted.

The RAMRDWR signal is generated at the output of NAND-gate 158 on line 159 through buffer 160 to line 161. The inputs to NAND-gate 158 include the signal on line 122 indicating a SRAM read operation and the signal on line 146 indicating a SRAM write operation.

The remaining signals generated by the read/write control logic shown in FIG. 3 include the RD018Q signal, the RD927Q signal, the RD918Q signal and the RD1827Q signal. These signals correspond, respectively, to the read 0/180 signal, the read 90/270 signal, the read 90/180 signal and the read 180/270 signal shown in FIG. 2A. These signals are generated by a decode of the RT1 and P:T0 signals which are supplied on lines 162 and 163, respectively and the RDMODE signal from line 130. The RD018Q signal is supplied at the output of NAND-gate 164. The inputs to NAND-gate 164 include the RT0 signal as supplied through inverter 165 on line 166. The second input to NAND-gate 164 is the RDMODE signal on line 130. Thus, the output of the NAND-gate 164 as supplied on line 167 is asserted active low when the RT0 signal is low and the RDMODE signal is asserted. This indicates that a read of either a 0 or 180 degree rotation is being requested.

The RD927Q signal is supplied at the output of NAND-gate 168. The inputs to NAND-gate include the RT0 signal on line 163 and the RDMODE signal on line 130. Thus, the output of NAND-gate 168 on line 169 is asserted active low when RT0 is high and a read is being requested indicating a 90 or 270 degree rotation.

The RD918Q signal is supplied at the output of NAND-gate 170 on line 171. Inputs to NAND-gate 170 include the signal on line 172 and the RDMODE signal on line 130. The signal on line 172 is supplied at the output of the exclusive OR-gate 173. The inputs to the exclusive OR-gate 173 include the RT1 and RT0 signals on lines 162 and 163, respectively. Thus, when RT0 and RT1 are different and the read mode signal is asserted, either a 90 or 180 degree read is being requested as indicated by the signal on line 171.

The RD1827Q signal is supplied on line 174 at the output of NAND-gate 175. The inputs to NAND-gate 175 include the RT1 signal on line 162 and the read mode signal on line 130. Thus, a 180 or 270 degree read is being requested as indicated on line 174 when the RT1 signal is high in the read mode.

The read/write control logic shown in FIG. 3 generates control signals used in the generation of addresses by the circuitry illustrated in FIG. 2B to control the RAM latch 16 of FIG. 2A and the accessing to the data array 18.

In particular, the RAM latch is clocked by the DATAWR signal from line 149 to latch incoming data. The RDMODE signal uses an output enable signal for the latch.

Figure 12:
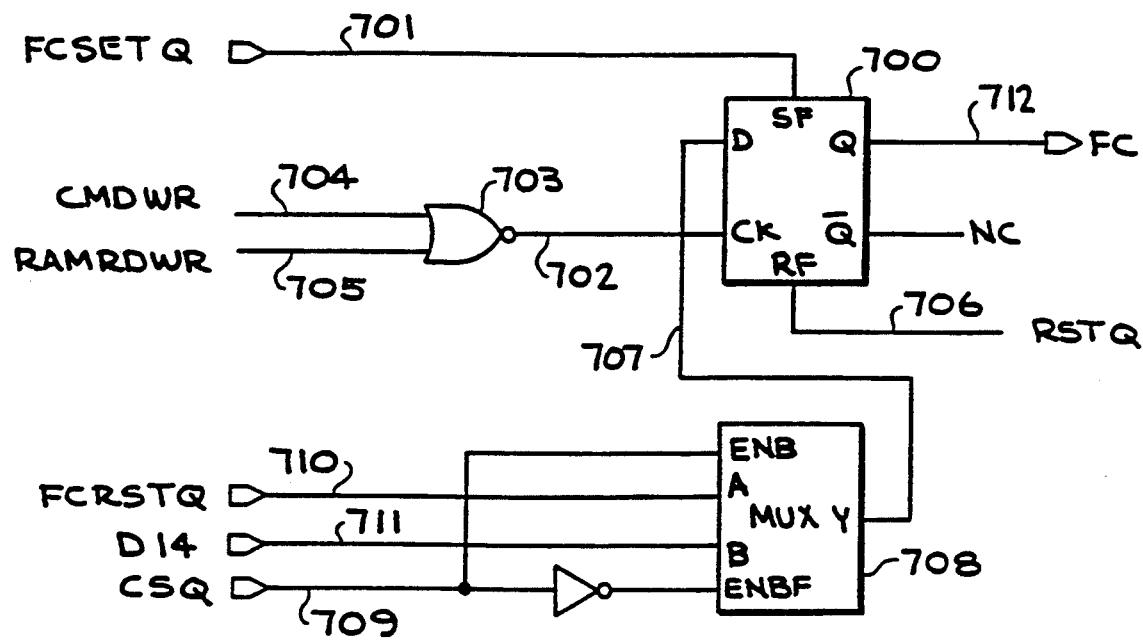
FIG. 12 is , a logic diagram illustrating the implementation of the register for holding the token signal FC in the control status register of FIG. 2A.

In addition, the control status register 14 is clocked by the CMDWR signal from line 115 and uses the command WR signal and the RAMRDWR signal from lines 115 and 161, respectively in logic for clocking the FC register as described with reference to FIG. 12 below.

The use of the signals generated by the read/write control logic is shown in FIG. 3 in the array 118, in the cascade control logic, the address generating logic and the transpose/mask logic as described below with reference to detailed figures.

C. The SRAM Array and Data Organization

Figure 4:
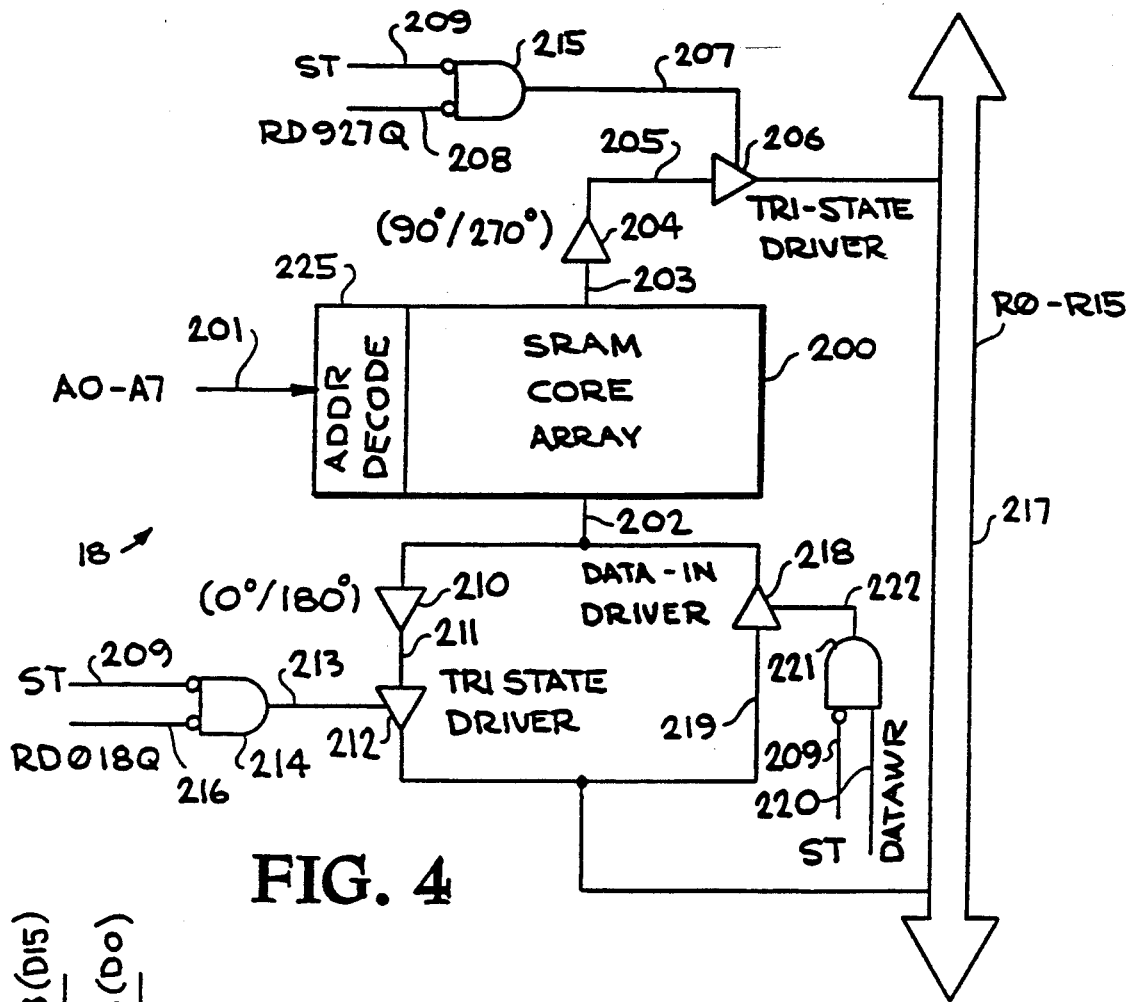
FIG. 4 is a schematic diagram of the storage means of FIG. 2A.

FIG. 4 is a schematic diagram of the SRAM array 18 of FIG. 2A. The SRAM array includes a SRAM core array 200 with a unique organization by which an address supplied at input lines 201 is decoded to supply a 0 degree rotated word on line 202 or a 90 degree rotated word on line 203. Thus, the words supplied in response to a single address which is supplied through address decoder 225 to the RAM core array 200, are different and automatically accomplish rotation of 0 or 90 degrees of a bit-map image stored in the SRAM core array. This organization is described below with reference to FIGS. 5A and 5B. The RAM core array 200 includes a 90/270 degree port which receives a 90 degree rotated 16-bit word on line 203 through buffer 204 to line 205. Line 205 is connected to a tri-state bus driver 206 which is enabled by the signal on line 207. The signal on line 207 is asserted when the RD927Q signal on line 208 is asserted as described with reference to FIG. 3, and clocked by the ST signal on line 209.

In addition, a 0/180 degree read/write port is connected to the SRAM core array 200 across lines 202. Lines 202 as an output are supplied through driver 210 to lines 211 which are connected to a tri-state bus driver 212. The tri-state bus driver 212 is enabled by the signal on line 213 which is supplied through AND-gate 214. AND-gate 214 is enabled by the RD018Q signal on line 216 and clocked by the ST signal on line 209. Zero degree rotated words are supplied in response to an address through the tri-state buffer 212 to the output bus 217. In addition, data input is supplied through data-in driver 218 across line 219. The data-in driver 218 connects the lines 202 for loading data into the RAM core according to the organization described below. The data-in driver 218 is enabled by the DATAWR signal on line 220 and clocked by the ST signal on line 209 as supplied through AND-gate 221 (on line 222).

The memory array maps a 64 by 64 pixel bit-map frame into 256 words, each 16-bits wide as shown in FIG. 5A. The RAM is organized in 16 rows of 16 words each. Four rows corresponding to a single vertical bank: and each column of 16 words corresponding to a horizontal bank.

Data is written into the array to facilitate the 90/270 degree read operation through the tri-state driver 206. The operation is carried out in a manner similar to common SRAMs. Each 16-bit word is written through the 0/180 degree port so that it is distributed through the 16 horizontal banks as shown in FIG. 5A. Thus, word 0, bit 0, is in vertical bank 0; word line 0, horizontal bank 0; word zero, bit 1 is in vertical bank 0, word line 0, horizontal bank 1, and so on until word 0, bit 15 is in vertical bank 0, word line 0, horizontal bank 15. This facilitates the read-out of a rotated data through the 90/270 degree port. The write differs from traditional SRAMs in that it organizes the data as it writes modulo-4, i.e., it writes the first word distributed along the first word line in the 16 horizontal banks, the second, third and fourth words (words 1–3) distributed along the second, third and fourth word lines in the 16 horizontal banks. However, the fifth, sixth, seventh and eighth words (words 4–7), are not written in the fifth through eighth word lines. Rather, they are written in word lines 0 through 3 at the second bit position in each of the horizontal banks. The 16 horizontal banks in a given vertical bank of 4 word lines, are written in this "modulo-4" manner up through word 63. The pattern then repeats in the remaining three vertical banks as shown in FIG. 5A.

Figure 5B:
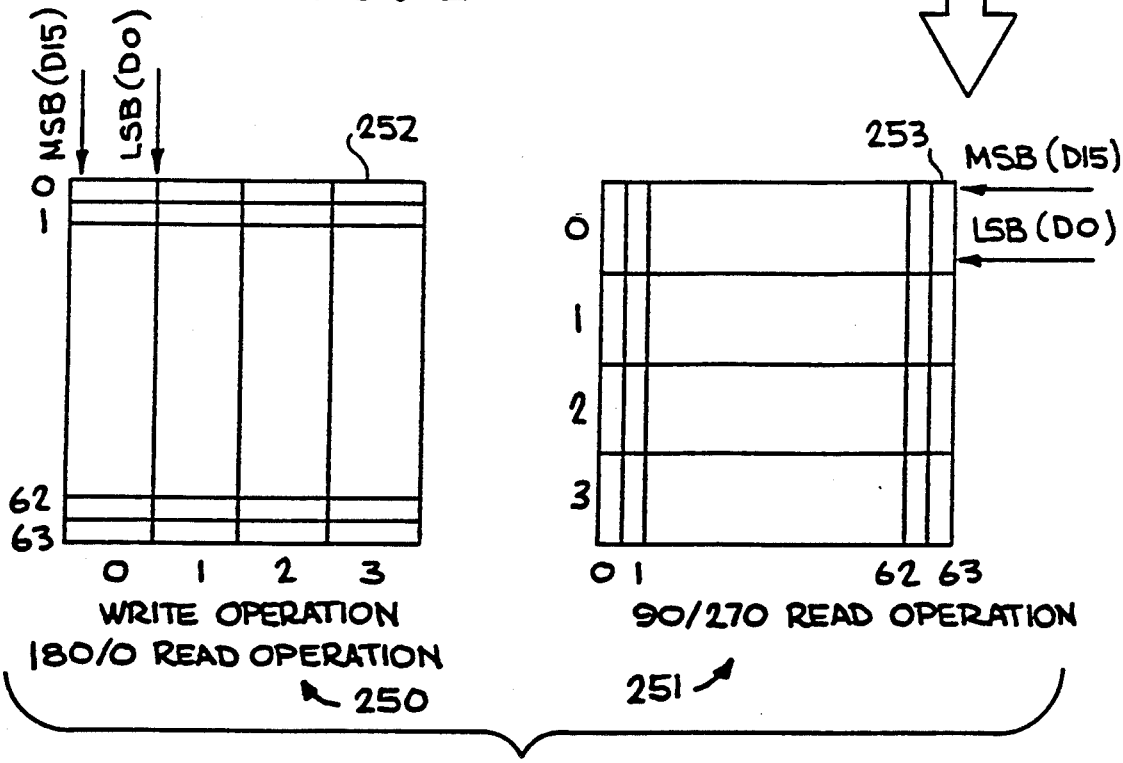
Figure 5A:
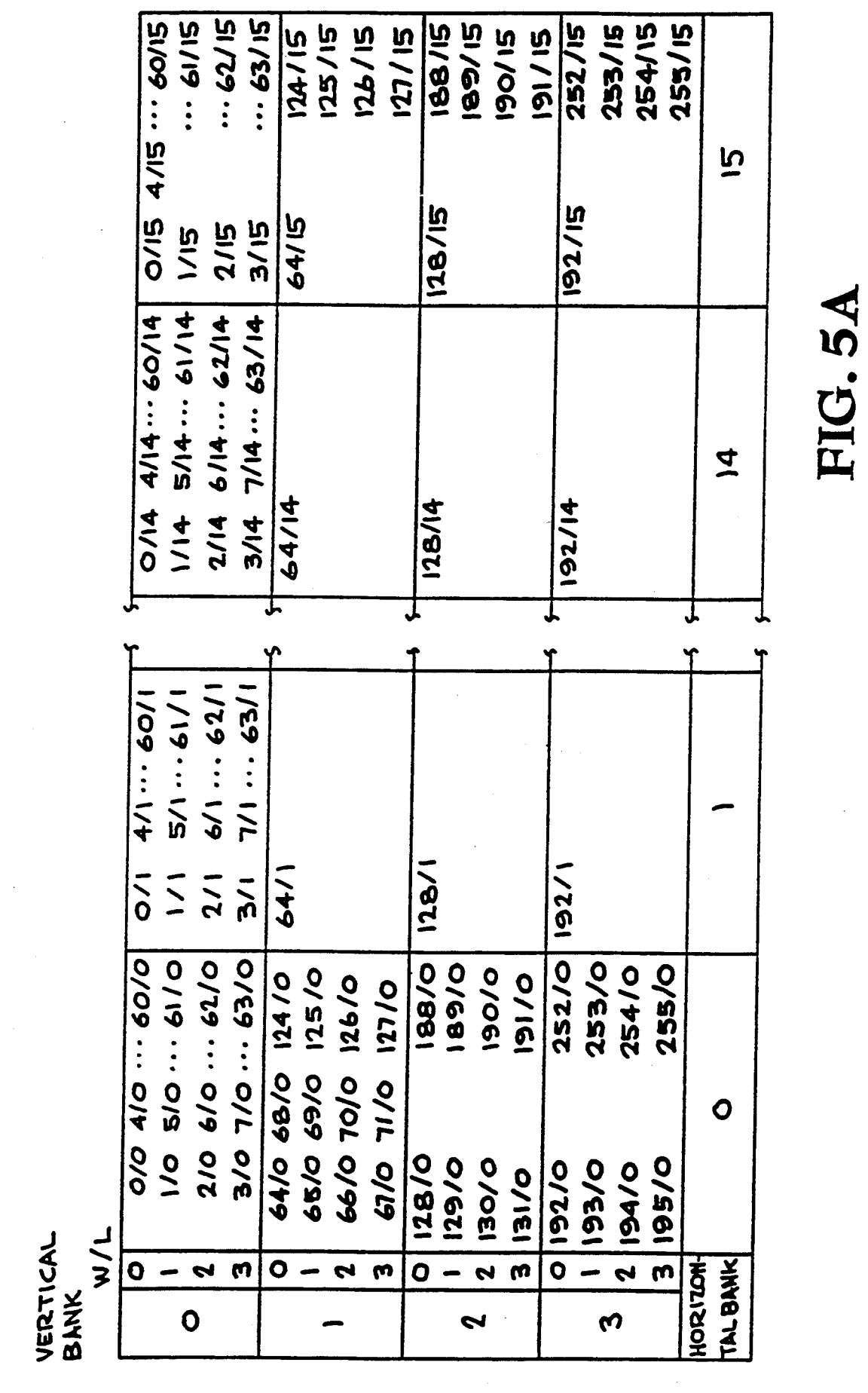

With reference to FIG. 5B, the reasons for this configuration of the array are illustrated. Consider a bit-map stored in the format shown on the left block 250 for the 180/0 degree read or write operation. In that case, the upper left hand corner includes a first word of data for the bit-map. For 90 or 270 degree read operation, the first word of data is located in the right hand corner in the manner shown on the right hand block 251 of the figure. Thus, it can be seen that if one wants to map the bits from the 0 degree write to a 90 degree read, the last bit in the fourth word 252 on the first word line and each succeeding word line, for a total of 16 word lines, should be configured into the first word 253 of the rotated read. As can be seen with reference to FIG. 5A, the last bit of the last word, word 3, bit 15, is stored in the same word, that is word line 3, vertical bank 0, horizontal bank 15, with each of the last bits of the fourth, eighth, twelfth and so on to the sixty-fourth word (words 3,7. . . 63) to make a 16-bit rotated word. The same holds true for each of the data words shown in FIG. 5A. With proper addressing sequences, a rotated bit-map can be generated as described with reference to FIGS. 6A and 6B. For a 0 or 180 degree read the addresses are generated in normal mode. For a 0 degree read or write, address starts with all zeros and increments one word at a time to word 256 as shown in FIG. 6A. The difference is that the 0 degree read/write port accesses a normal set of locations corresponding to each bit from word 0 from each of the 15 horizontal banks at a time. Thus, normal sets are organized along word boundaries in a logical direction. The numbers indicating the data locations in FIG. 5A correspond to the word and bit for the 0 degree port read or write in the form, normal mode word number/bit number. FIG. 6A labels address bits A7–A6 as vertical bank VB, bits A5–A2 as bit line BL and bits A1–A0 as word line WL. Thus normal word 0 is distributed to bit line 0 of all rotated words in vertical bank 0, word line 0. Normal word 1 is bit line 0, word line 1, vertical bank 0 of the rotated words.

For a 180 degree read, the normal mode is used but the addresses are generated in reverse order beginning with the 256th word (word 255) as shown in FIG. 6C. As explained below, this 180 degree read requires that the bits of each word be transposed so that the image will be truly reproduced when rotated. In the 180 mode, address bits A7-A6 are vertical bank, A5-A2 are bit line and A1-A0 are word line.

For a 90 degree read mode, the address sequence is shown in FIG. 6B. As can be seen with reference to FIG. 5B, the first rotated word for a 90 degree read desires to contain the 15th bit of normal words 3, 7, 11 and so on to word 63. Thus, rotated words are organized along word boundaries in the logical Y direction. Accordingly, the first address in the address sequence is shown at the top in rotated word line 3, horizontal bank 15 and vertical bank 0. The address sequence is generated by incrementing the vertical bank until the fourth vertical bank is accessed, then decrementing the horizontal bank and repeating the sequence. This process is repeated until each of the 16 horizontal banks has been accessed for word line 3 at which point the same sequence is repeated for each of the word lines 2, 1 and 0 until the entire image has been read out. In the rotated mode address bits A1-A0 are word line, bits A5-A2 are horizontal bank and A7-A6 are vertical bank.

For a 270 degree read, the addressing sequence is reversed as shown in FIG. 6D. Thus, the sequence begins with word line 0, horizontal bank 0, vertical bank 3. The vertical bank is decremented until vertical bank 0 and then the horizontal bank is incremented. The pattern for the vertical bank is repeated for each horizontal bank up to bank 15. When all the horizontal banks have been accessed for word line 0, the word line is incremented and the pattern is repeated for each of the word lines up to word line 3. In the rotated mode address bits A1-A0 are word line, bits A5-A2 are horizontal bank and A7-A6 are vertical bank.

These addresses are generated by the address generating logic mentioned above with reference to FIG. 2B. The X address generation, Y address generation and RAM translation logic below in detail to describe the manner in which the address sequences are generated in response to the logical image size information and the rotation mode of operation.

D. Address Generating Logic

Figure 7:
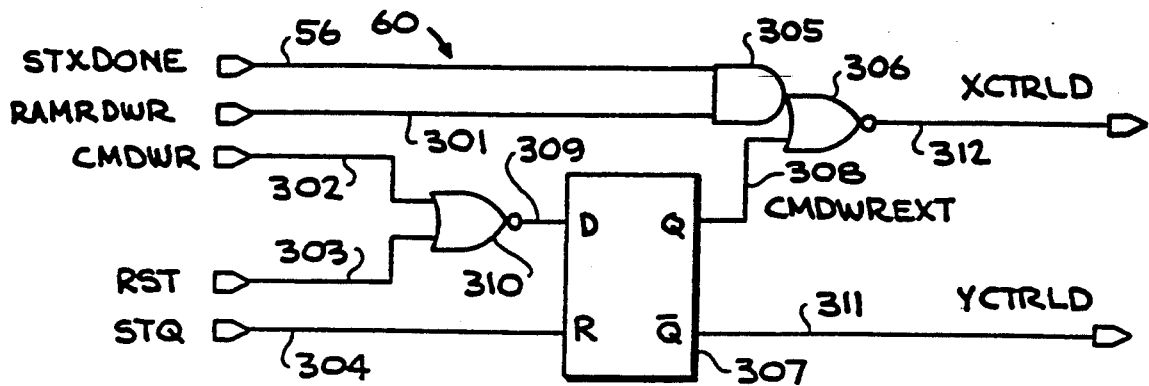
FIG. 7 is a logic diagram of the counter load logic of FIG. 2B.
Figure 8:
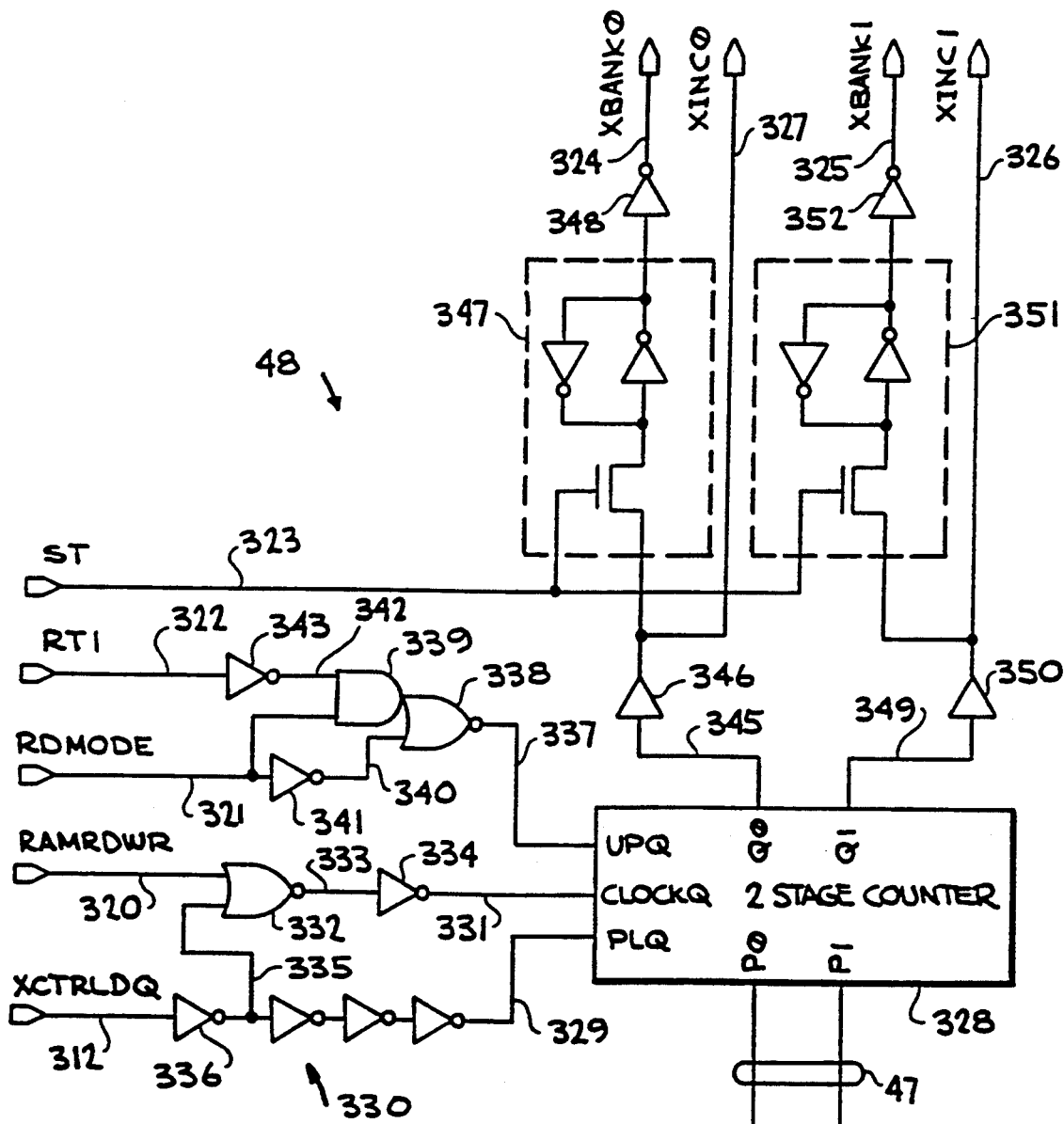
FIG. 8 is a logic diagram of the X-address generating logic of FIG. 2B.
Figure 9:
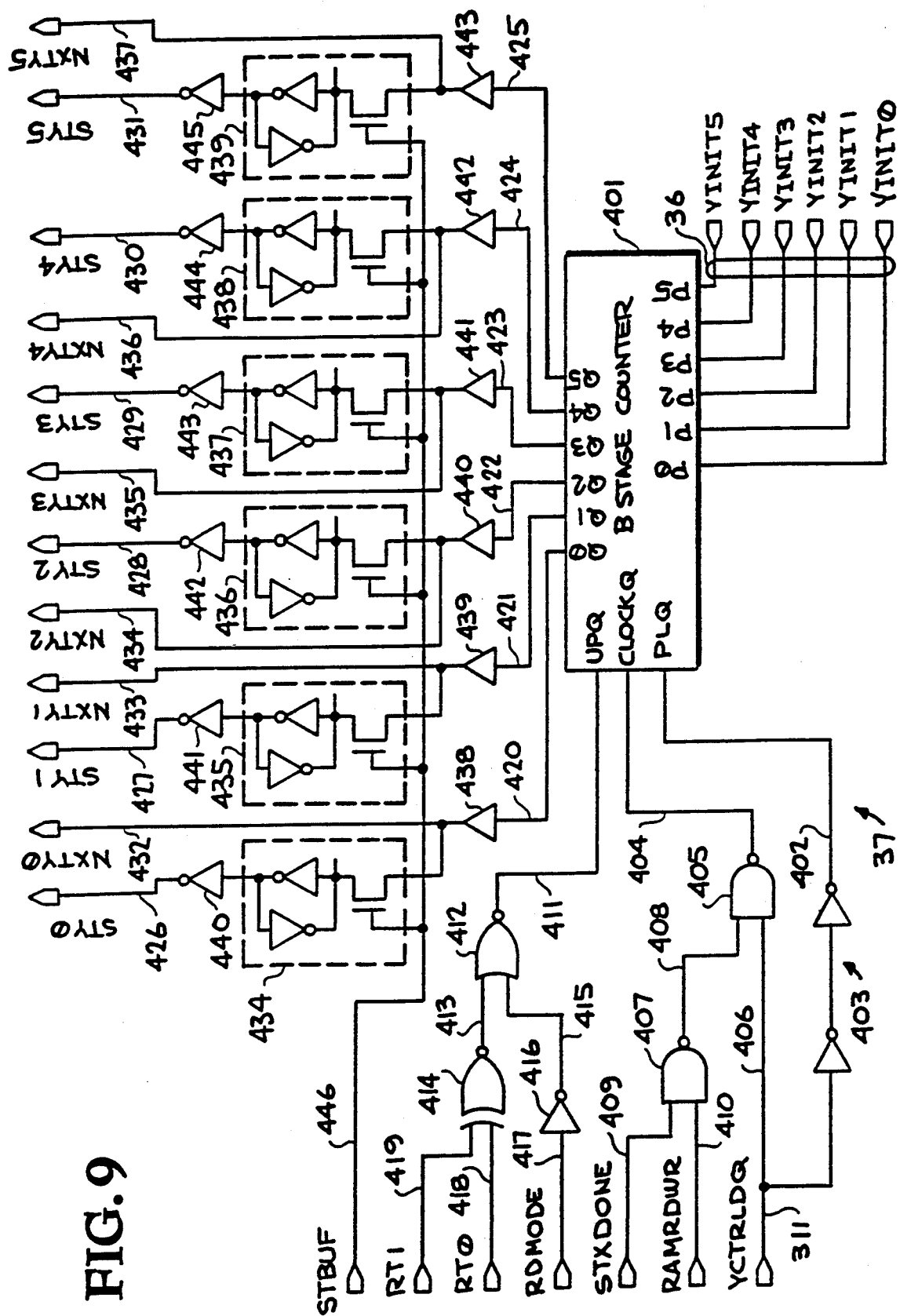
FIG. 9 is a logic diagram of the Y-address generating logic of FIG. 2B.
Figure 10:
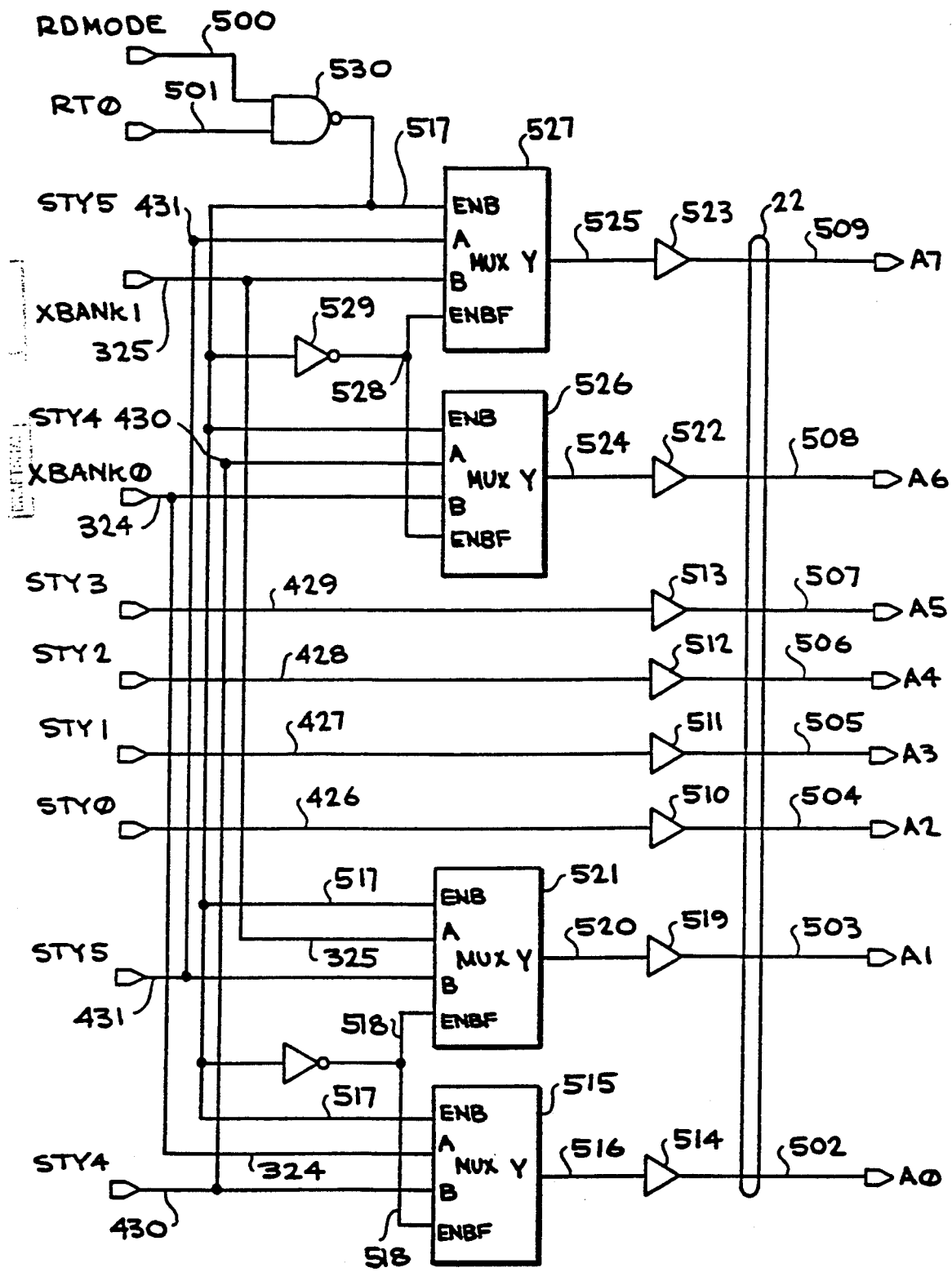
FIG. 10. is a logic diagram of the RAM address translating logic of FIG. 2B.

As mentioned above, the address generating logic shown generally in FIG. 2B, operates to produce the appropriate sequence of addresses, A0-A7 on line 22 to accomplish a 0 degree, 90 degree, 180 degree, or 270 degree read operation from data stored in the SRAM array. The key functional components of the addressing logic shown in FIG. 2B are illustrated in more detail in FIGS. 7-10. FIG. 7 shows the counter-load logic 60, FIG. 8 shows the X address generation logic 48, FIG. 9 shows the Y address generation logic 37, and FIG. 10 shows the SRAM address translation logic 39.

FIG. 7 illustrates the generation of the Y counter load, YCTRLD, and the X counter load, XCTRLD, signals which are supplied to the Y address generating logic 37 and the X address generating logic 48, respectively. Inputs to the counter load logic 60 include the STXD signal on line 56 from the X limit comparator 50 as mentioned above. In addition, the RAMRDWR signal from the read/write control logic on line 301, the CMDWR signal on line 302 from the read/write control logic, the RST signal on line 303 and the STQ signal on line 304 are inputs.

The STXD signal on line 56 and the RAMRDWR signal on line 301 are supplied as inputs to AND-gate 305. The output of the AND-gate 305 is supplied as a first input to NOR-gate 306. The second input to NOR-gate 306 is the output of set/reset flip-flop 307 on line 308 labelled the CMDWREXT signal. The flip-flop 307 is set by &:he signal on line 309 which is supplied at the output of NOR-gate 310. The inputs to NOR-gate 310 include the CMDWR signal and the RST signals on line 302 and 304, respectively. The flip-flop 307 is reset by the STQ signal on line 304. The inverted output of the set/reset flip-flop 307 is supplied on line 311 as the YCTRLD signal. The output of the NOR-gate 306 is supplied on line 312 as the XCTRLD signal. The signal on line 309 sets the flip-flop 307 when either CMDWR or the RST signals are asserted. Thus, the CMDWREXT signal on line 308 enables the XCTRLD signal during a control status register write access that changes the contents of the control status register. The YCTRLD signal will likewise be enabled when the set/reset flip-flop 307 is set by the signal on line 309. Otherwise, the YCTRLD signal will be disasserted during the low cycle of ST, conversely, the high cycle of STQ on line 304, and remain inactive until a CMDWR or RST signal is asserted. The XCTRLDQ signal on line 312 is asserted either when the CMDWREXT signal on line 308 is low or at the end of an SRAM access of XAR words in a row which is indicated by the signals RAMRDWR and STXD on lines 56 and 301, respectively.

The YCTRLD and XCTRLD signals are supplied to the Y address generating logic 37 and the X address generating logic 48 to initialize the generation of the next address sequence. The X address generating logic 48 is shown in FIG. 8. The initial X values XINIT0-XINIT1 are supplied on lines 47 from the multiplexer 45 shown in FIG. 2B. The control signals to the address generating logic include the XCTRLD signal active low on line 312, the RAMRDWR signal on line 320, the RDMODE signal on line 321, RT1 on line 322 and ST on line 323. The outputs include XB0 (XBANK0) on line 324 and XB1 (XBANK1) on line 325. In addition, XINC1 and XINC0 signals are supplied on lines 326 and 327, respectively.

The X-address generation logic 48 is based on a two-stage counter 328. The inputs to the two-stage counter include the XINIT0 and XINIT1 signals on line 47. The counter load input is supplied on line 329 through the series of inverters 330 which provide signal timing adjustment for the XCTRLDQ signal on line 312. The counter is clocked by the signal on line 331 which is generated at the output of NOR-gate 332 on line 333 through inverter 334. The NOR-gate 332 receives the RAMRDWR signal as one input and the XCTRLD signal on line 335 through inverter 336 from line 312. Thus, the clock signal is generated during a RAM read-write or when the XCTRLD signal is asserted. The counter 328 is clocked when the signal on line 331 is high. The count-up control signal active low is supplied on line 337 at the output of NOR-gate 338. The inputs to NOR-gate 338 include the output of AND-gate 339 and the signal on line 340. The signal on line 340 is the RDMODE signal supplied through inverter 341 from line 321. The inputs to the AND-gate 339 include the RT1 signal on line 342 supplied through inverter 343 and the RDMODE signal on line 321. Thus, the counter counts up when the signal on line 337 is low which indicates that either the output of AND-gate 339 is high or the RDMODE signal is not asserted. The output of AND-gate 339 is high during a read mode when RT1 is low which corresponds to a 0 or 90 degree read. Otherwise, the counter counts down. The outputs to the counter are supplied on lines 345 and 349, respectively. The XB0 signal on line 324 is the output of the counter 328 on line 345 supplied through buffer 346 to latch 347. The latch 347 is clocked by the ST signal on line 323. The output of the latch 347 which operates as an inverter is supplied through an inverting buffer 348 as the XB0 signal. Similarly, the signal on line 349 is supplied through buffer 350 to latch 351 which is clocked by the ST signal. The output of the latch 351 which is inverted is supplied through the inverting buffer 352 as the XB1 signal. The XINC0 and XINCl signals are supplied directly from the output of buffers 346 and 350, respectively, across lines 327 and 326, respectively.

FIG. 9 illustrates the Y address generation logic 37 which is used to implement the address sequences discussed above for 0, 90, 180 and 270 degree addressing sequences. The Y address generating logic 37 is based on a six-stage counter 401. The inputs to the six-stage counter 401 include the initial Y values YINIT0-YINIT5 supplied on lines 36 from FIG. 2B. The counter load input signal is supplied on line 402 through the inverter stages 403, providing a delay, from the YCTRLD active low signal on line 311. The counter is clocked by the signal on line 404 at the output of NAND-gate 405. The inputs to NAND-gate 405 include the YCTRLD active low signal on line 406 and the output of NAND-gate 407 on line 408. The inputs to NAND-gate 407 include the STXD signal on line 409 and the RAMRDWR signal on line 410. The counter 401 is clocked when the signal on line 404 is high. The signal on line 404 is high when the YCTRLDQ signal is asserted or the output of NAND-gate 407 is low. The output of NAND-gate 407 is low when the STXD signal and the RAMRDWR signals are high, indicating that the X address generation has gone through its counter sequence and the mode is RAM read/write.

The six-stage counter counts up when the signal on line 411 is low and counts down when the signal on line 411 is high. The signal on line 411 is supplied at the output of NOR-gate 412. NOR-gate 412 receives as inputs the signal on line 413 from exclusive NOR-gate 414 and the signal on line 415, which is the RDMODE signal supplied through inverter 416 from line 417. The inputs to exclusive NOR-gate 414 include the RT0 and RT1 signals on lines 418 and 419, respectively. Thus, the signal on line 411 is low indicating a countup mode during a write mode, as indicated by the signal on line 415 and during a 0 or 270 degree read as indicated by the output of the exclusive NOR-gate 414. Otherwise, the signal on line 411 is low indicating a countdown mode.

The outputs to the counter 401 are supplied on lines 420, 421, 422, 423, 424 and 425 and result in generation of the STY0-STY5 signals on lines 426 though 431. Also, the NXTY0-NXTY5 signals are supplied on lines 432 437. The STY0-STY5 signals are supplied through buffers 438-443, latches 434-439 and inverting buffers 440-445, respectively. Each of the latches 434-439 are clocked by the ST signal on line 446.

The address translation logic 39 fo generating signals A0-A7 from the STY0-STY5 and XB0-XB1 signals is shown in FIG. 10. The address translation logic 39 translates the Y addresses STY5-STY0 on lines 431-426 and the X addresses XB1 and XB0 on lines 425 and 424 to the SRAM addresses A7-A0 on lines 509-502, which correspond to the line 22 in FIG. 2B. The translation logic 39 in FIG. 10 supplies the Y address bits STY0-STY3 on lines 426-429 directly through buffers 510-513 to lines 504-507. Signals STY4 and STY5, however, are multiplexed with signals XB1 and XB0 to supply the signals A0, A1, A6 and A7 on lines 502, 503, 508 and 509, respectively.

Thus, the signal A0 is supplied on line 502 through buffer 514 from the output of multiplexer 515 on line 516. The two selectable inputs to the multi.plexer 515 include B input STY4 on line 430 and A input XB0 on line 324. The multiplexer is enabled to select the A input when the signal on line 517 is true and the signal on line 518 is false. Similarly, the address signal on line 1.1 is supplied on line 503 at the output of buffer 519. The input to buffer 519 is a signal on line 520 at the output of multiplexer 521. The selectable inputs to multiplexer 521 include B input STY5 on line 431 and A input XB1 on line 325. Multiplexer 521 is enabled to select STY5 on line 431 as its output when the signal on line 518 is asserted and the signal on line 517 is low.

Address bits A6 and A7 on lines 508 and 509 are generated in a similar manner. Particularly, they are supplied through buffers 522 and 523, respectively, which receive as inputs on lines 524 and 525 the outputs of multiplexers 526 and 527, respectively. The A input to multiplexer 526 is the STY4 signal on line 430 and the B input to multiplexer 526 is the XB0 signal on line 324. The A input to multiplexer 527 is the STY5 signal on line 431 and the B input to multiplexer 527 is the XB1 signal on line 325. Multiplexers 526 and 527 are enabled to select the B inputs when the signal on line 517 is low and the signal on line 528 is high.

The signal on line 528 is the inverse of the signal on line 517 supplied through the inverter 529. The signal on line 517 is asserted at the output of NAND-gate 530. The inputs to NAND-gate 530 include the RDMODE signal on line 500 and the RT0 signal on line 501. Thus, the signal on line 517 is high during a read mode when RT0 is high, indicating a 90 or 270 degree read.

The resulting address mapping accomplished by the address translation logic 39 is as set out in Table 1 below.

TABLE 1

| 0/180° Write or Read Mode | 90/270° Read Mode |
|---|---|
| A7 : STY5 | A7 : XBANK1 |
| A6 : STY4 | A6 : XBANK0 |
| A5 : STY3 | A6 : STY3 |
| A4 : STY2 | A4 : STY2 |
| A3 : STY1 | A3 : STY1 |
| A2 : STY0 | A2 : STY0 |
| A1 : XBANK1 | A1 : STY5 |
| A0 : XBANK0 | A0 : STY4 |

As can be seen, the XB0 and XB1 signals are the most significant bits of the SRAM address in the 90/270 degree read modes and the 0 degree write mode's, whereas XB0 and XB1 are the least significant bits int he 0/180 degree read odes.

E. Output Logic

The output logic is illustrated in FIG. 2C and includes the mak decoder 71 and the transpose/mask logic 65. The transpose/mask logic 65 is shown in FIG.

11. The mask decode 71 implements the following truth table in which bit 15—bit 1 correspond to B15 —B1 on line 70 of FIG. 2C.

TABLE 2

| YMAX3-0 Hex | Bit 15 ... Bit 1 Binary |
|---|---|
| 1 | 0............01 |
| 2 | 0...........011 |
| 3 | 0...........111 |
| 4 | 0.........01111 |
| 5 | 0.........11111 |
| 6 | 0........111111 |
| 7 | 0.......1111111 |
| 8 | 0......11111111 |
| 9 | 0.....111111111 |
| A | 0....1111111111 |
| B | 0...11111111111 |
| C | 0..111111111111 |
| D | 0.1111111111111 |
| E | 011111111111111 |
| F | 111111111111111 |

Figure 11:
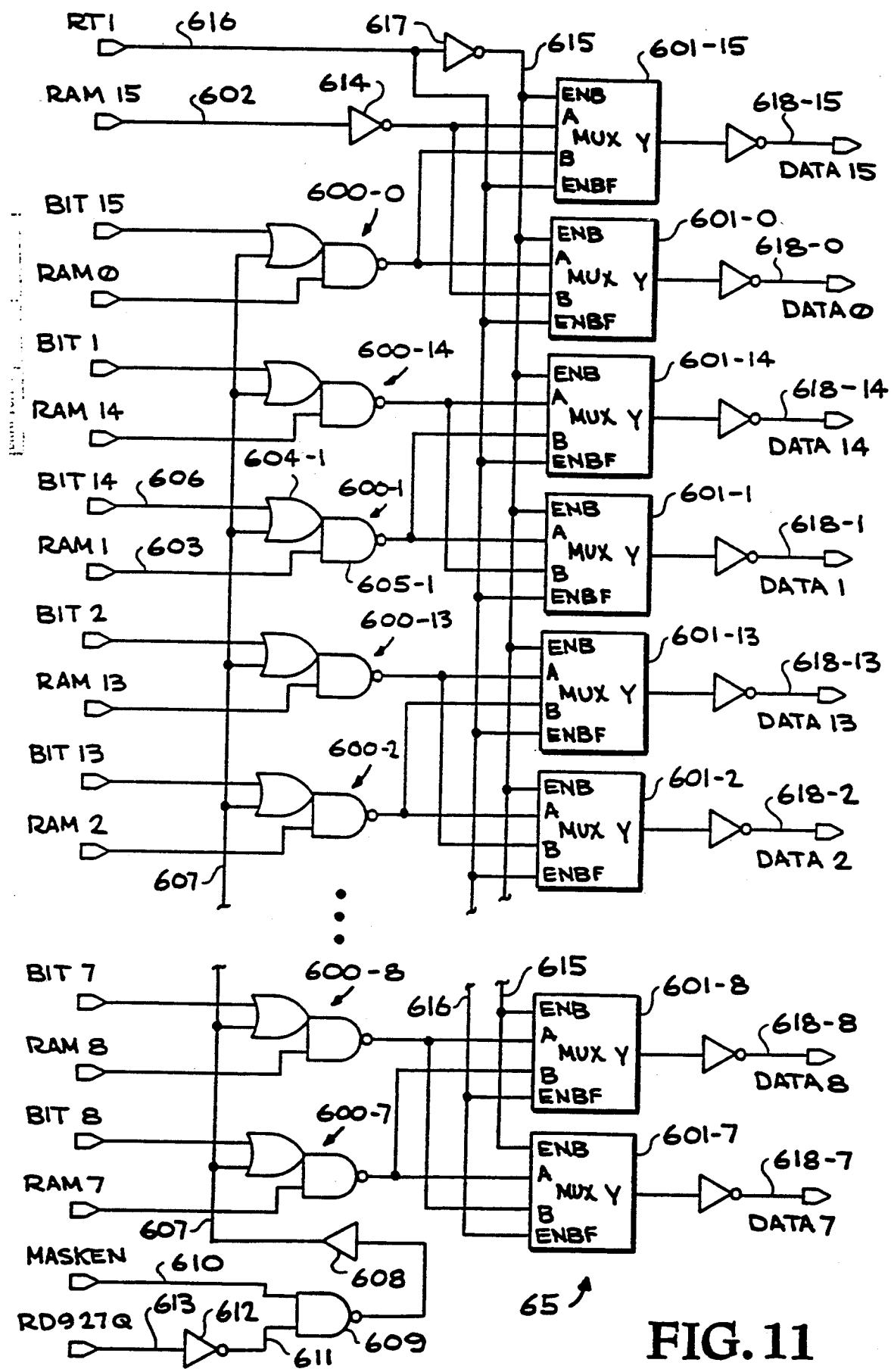
FIG. 11 is a, logic diagram of the transposing/masking logic of FIG. 2C.

The mask enable signal online 71 as mentioned above, is true when YMAX4 and YMAX5 are equal to XB0 and XB1. The implementation of the transpose/mask logic 65 is shown in detail in FIG. 11. The transpose/-mask logic shown in FIG. 11 includes a series of masking gates 600-0 through 600-14 and a series of output multiplexers 601-0 through 601-15.

Each SRAM output bit with the exception of the least significant bit, RAM15 on line 602, is supplied through a masking gate; for instance, masking gate 600-1 for RAM1 on line 603. Masking gate 600-1 includes an OR-gate 604-1 and a NAND-gate 605-1. The first input to the OR-gate is the mask output bit for RAM1, BIT14 supplied on line 606. As can be seen with reference to FIG. 11, the sum of the position of the mask output bit and the RAM bit always equals 15. The second input to the OR-gate 604-1 is a signal supplied on line 607. The signal on line 607 is supplied through buffer 608 from the output of NAND-gate 609. The inputs to NAND-gate 609 include the MASKEN signal on line 610 which corresponds to line 72 in FIG. 2C from the comparator 73. The other input in NAND-gate 609 is the signal on line 611 supplied through inverter 612. The input to inverter 612 is the RD927Q signal on line 613 generated by the read/write control logic (corresponding to the read 90/270 signal). Thus, the signal on line 607 must be low to enable the masking gates 600-1 through 600-14. It will be low only when the MASKEN signal is asserted and a 90 or 270 degree read is being performed. The output of the masking gate 600-1 is the inverted output of the RAM when the mask is not enabled or when the mask is passing through the RAM bit. Therefore, RAM bit 15 on line 602 is supplied through inverter 614 to the multiplexing stage.

The series of multiplexers 600-0 through 600-15 operate to transpose the output of the RAM during the 180 or 270 degree read operations. It consists of a series of two input multiplexers which are enabled to select a B input when the RT1 signal is high as indicated by the signal on line 615 which is supplied from the RT1 signal on line 616 through inverter 617. Each of the 15 multiplexers 601-0 through 601-15 receives two RAM bits at the output of the masking gates such that the sum of the bit position of the RAM bits always equals 15. Thus, multiplexer 601-15, which supplies the output bit DATA15 on line 618-15, receives the inverse of RAM bit 15 on line 602 through inverter 614 at its A input and the output of the RAM0 mask gate 600-0 as its B input. In the transposing mode, the signal on line 618-15 will correspond to RAM bit 0. In the non-transposing mode the signal on line 618-15 corresponds to RAM bit 15. The multiplexer 601-0 receives as its A input the output of the RAM0 mask gate 600-0 and as its B input the output of the RAM15 inverter 614. Thus, the signal on line 618-0 corresponds to RAM bit 0 in the non-transposing mode and RAM bit 15 in the transposing mode.

Each pair of multiplexers supplying the output signals DATA1-DATA14 for two corresponding data lines whose sum of bit positions equals 15 are connected similarly. Thus, for data line 8, multiplexer 601-8 receives as its B input the output of the RAM7 mask gate 600-7 and as its A input the output of the RAM8 mask gate 600-8 and supplies the RAM8 bit in the non-transposing mode and the RAM7 bit in the transposing mode to output line DATA8. Likewise, multiplexer 601-7 receives as its B input the output of the RAM8 mask gate 600-8 and as its A input the output of the RAM7 mask gate 600-7 and supplies the RAM8 bit in the transposing mode as DATA7 to data line 618-7 and the RAM7 bit in the non-transposing mode. The outputs DATA0 through DATA15 on line 618-0 through 618-15 of FIG. 11 correspond to the outputs on line 66 of FIG. 2C.

F. Read and Write Operation Modes

The ORP has five operation modes: reset, normal read, normal write, fly-by read and fly-by write. The fly-by read and fly-by write modes are intended to minimize the external controllers overhead in the rotation process. In the fly-by modes, the chip select signals CS and GS are not asserted and data is either read from or written to a bus connected to a font memory or the like.

The three chip enable signals, CS, GS and FB are generated by external address decode logic under control of the central processing unit or otherwise.

In the normal and fly-by write modes, the data is written in a 0 degree configuration as described above with reference to FIG. 5A. In the normal or fly-by read modes, the data is read out of the SRAM array, rotated either 0 degrees, 90 degrees, 180 degrees or 270 degrees going in the counter-clockwise direction.

In the reset mode, the ORP goes into an idle state. The control status register is cleared but the internal memory array is not cleared. The CHIPEN and FC bits in the control status register are forced to 0, so the ORP ignores all data transfers on the external bus.

For the write operation, the XAR and YAR logical image size bits treat the bit-map image as four 16-bit horizontal banks 64 lines deep. The XAR bits specify the horizontal bank and the YAR bits specify the row in the horizontal bank. Therefore, each row includes four 16-bit words, one in each horizontal bank.

For each image, the user supplies the XAR and YAR bit flags. For example, for an image size 32 by 40 bits, the XAR bits are 01 specifying banks 0 and 1 and the YAR bits are the binary equivalent of 39 specifying the 40th line. In the write operation, the source data is loaded into the logical address space from the top left position such as shown in FIG. 5B; thus, the logical start address is always bank 0 vertical address 0. Both the X address and Y address generators are set to 0 at the beginning of the write operation. For each access, the X address generator is incremented. When the bank address reaches the value of the XAR bits in the control status register, the vertical address counter is incremented and the X address counter is set to zero. The process is continued until the whole image block is written into the SRAM.

The access to the ORP begins with a high on the ST input. The address generators update each address on the falling edge of the ST input. The ST signal can be supplied by typical CPU systems using the address latch enable signals at the beginning of each CPU cycle.

The write operation in the normal write mode is performed under the condition that the GS input is low and the WR input is low. Data is loaded to the ORP on the rising edge of the WR input. In the fly-by write mode, the FB input must be driven low and the RD input is used as a write strobe, such that data is written to the ORP by its rising edge.

The memory organization for the read operation in the 0 and 180 degrees modes is identical to that for the write operation shown in FIG. 5B. In the 90 and 270 degree read operation, the logical memory organization is rotated as shown in FIG. 5B. In the 90 and 270 degree rotated modes, the logical vertical direction is defined by the bank address and the logical horizontal direction is defined by the vertical address. The XAR bits must be set to the bank size on the word boundary and may include data locations where no valid data is written. For these areas, the masking logic generates a low value to the mask to prevent pass-through of invalid data. Thus, for our example of a 32×40 bit image, the word boundary for the rotated mode 40 lines translate into 3 rotated words of 16 bits each. Thus 8 bits of the third word must be masked.

In both the 0 and 180 degree read operation and the 90 and 270 degree read operation, bank 0 word 0 is specified as the upper left hand corner of the logical data array as shown in FIG. 5B. The XAR and YAR bits specify the logical size of the image block. These values are translated to the physical start address of the internal memory according to the angle of rotation. Thus, as mentioned above, the address sequences vary depending on the degree of rotation desired. For the 90 degree rotation, the YAR value is loaded into the vertical address counter in the Y generating logic and the counter is in the countdown mode. The X address generating counter starts from 0 and counts up. The X address generating counter increments for each read access. When the output of the X address generator reaches the XAR value, the Y address generating counter is decremented and the X address generating counter is set to 0. The process is repeated until the whole image block is accessed.

For the 270 degree rotation, the vertical address counter in the Y address generating logic is preset to 0 and counts up. The X address generating counter is set to the XAR value and counts down. The X address generating counter is decremented for each read access and when it reaches 0 the Y address generating counter is incremented and the X address generating counter is reset to the XAR value. When the process is complete, the entire image block is accessed.

In the 0 degree rotation, the X address generating counter starts at 0 and is incremented for each read access. The Y address generating counter starts at 0 as well and is incremented each time the X address generator reaches the XAR value; the X address generating counter is then reset to 0. The process is repeated until the whole image block is accessed.

For the 180 degree rotation, the X address generating counter and the Y address generating counter are preset to the XAR and YAR values, respectively. Each counter is set to the countdown mode. The X address generating counter is decremented for each read access. When it reaches 0, the vertical counter in the Y address generating logic is decremented and the X address generating logic counter is set to the XAR value again.

Similar to the write operation, the ST input indicates the beginning of a read access by going high. The normal read operation is performed when GS is low and RD is low. The fly-by read operation occurs when the FB input is driven low. In the FB mode, the WR signal is used as a read strobe.

G. Clipping

In many systems, a small bank buffer configuration is used as a video buffer. Thus, in dispatching an image, it is possible that the image block will reach a bank boundary on the video buffer before the complete image is written from the ORP. In this case, the image block will be sliced between two video buffers; hence, the term "clipping" in this application. The initial XAR/YAR values specify the size of an image block. These values are transferred to the address calculation logic. The ORP translates the XAR/YAR value to the physical memory address internally according to the rotation mode. When clipping occurs, the ORP sets the initial XAR value in the XAR register and the next physical memory address in the YAR bits of the command-status register. Thus, XAR is always the horizontal size of the image block. YAR is the size of the remaining data in the ORP that is yet to be transferred to the video buffer. The clipping is enabled by setting the CLP bit to 1. Accordingly, the means for setting the clipping logic include the Y multiplexer 31 in FIG. 2B, in combination with the control status register 14 in FIG. 2A and the next Y generating NXTY0–NXTY5 from the Y address generating logic shown in FIG. 2B.

H. Cascade Logic

Figure 29:
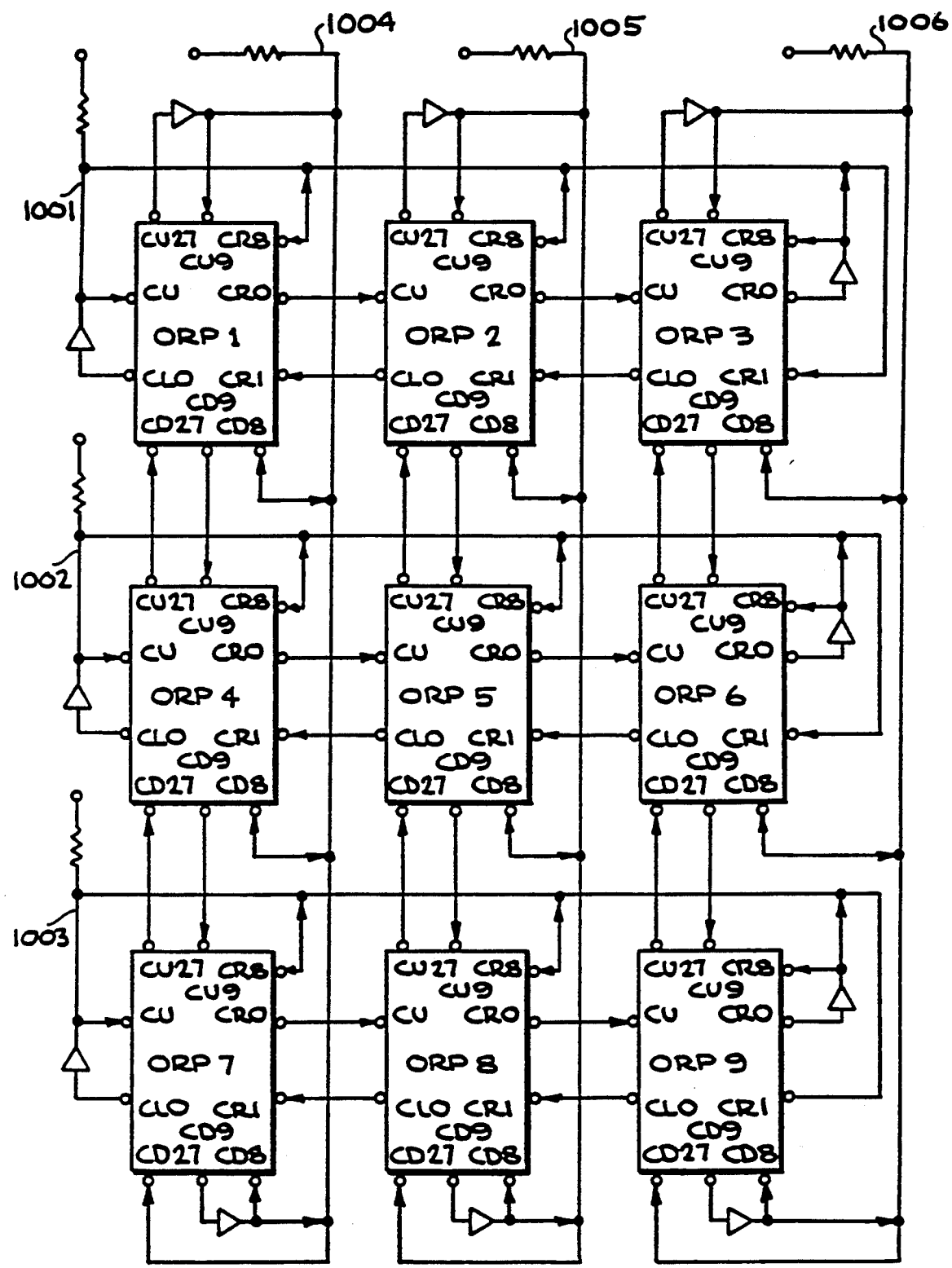
FIG. 29 is a connection diagram illustrating the cascade feature of the present invention.

As mentioned above, with respect to FIG. 2A, the ORP further includes means for generating cascade control signals to accomplish passing of the cascade token FC among a $ plurality of ORP chips connected together. FIG. 29 illustrates the interconnection of the cascade control signals in an array of ORPs. In the cascade configuration, all the control interface signals such as D0–D15, RD, WR, GS, and FB are connected together. Chip selection is performed by the internal cascade control logic in the ORP. In the cascade configuration, one ORP in the cascade receives the FC token and the cascade control signals control the propagation of the FC token from one ORP to another depending on the rotation mode.

As illustrated in FIG. 29, the cascade control signals are connected among the ORPs in the cascade. The system in FIG. 9 includes 9 ORPs, ORP1–ORP9. This effectively increases the size of the array from 64 by 64 bits in each ORP to 192 by 192 bits with no significant time loss in the read and write operations.

The CRB lines in each row of the array are connected together in lines 1001, 1002 and 1003. Likewise, the CDB lines in the three columns are connected on lines 1004, 1005, and 1006 and are connected also open drain. The open drain CRB and CDB lines all have pull-up resistors as illustrated.

The CRB, CLI, CRI and CRO and CLO signals are provided as horizontal direction cascade control. Thus, it can be seen that the CRO signal from ORP1 is connected to the CLI signal on ORP2 and the CRO signal on ORP2 is connected to the CLI signal on ORP3. The CRO signal on ORP3 is connected through a buffer to the CRB line 1001. Likewise, the CLI signal on ORP1, the CLO signal on ORP1 and the CRI signal on ORP3 are all connected to the output lines 1001. Each of the rows of ORPs illustrated in FIG. 29 are connected in a similar manner.

The CU9, CU27, CD9 and CD27 and CDB signals are provided to support vertical cascade control. Thus, the CD27 line on ORP1 is connected to the CU27 line on ORP4, the CD9 line on ORP1 is connected to the CU9 line on ORP4. The CD27 line on ORP4 is connected to the CU27 line on ORP7 and the CD9 line on ORP4 is connected to the CU9 line on ORP7. The CU27 line and the CU9 lines on ORP1 are connected to the CDB line 1004. Likewise, the CD27 and CD9 lines on ORP7 are connected to line 1004. Each of the vertical columns is connected in a similar manner to lines 1005 and 1006 and among each other.

These cascade control signals control the passing of the FC bit from one ORP to another. When the chip enable bit CHIPEN in a control status register in a particular ORP is set to 0, cascade input is bypassed directly to the output without processing.

The logic implementing the cascade control signal generation is shown in FIG. 2A as cascade control logic 15. The detail implementation of the logic is shown in FIGS. 13–28 with the implementation of the FC portion of the control status register in FIG. 12.

The FC register in the control status register 14 is made up of the D-type flip-flop 700. The D-type flip-flop 700 is set by the FCSET active low signal on line 701. The flip-flop 700 is clocked by the signal on line 702 which is supplied at the output of NOR-gate 703. The inputs to NOR-gate 703 include the CMDWR signal on line 704 and the RAMRDWR signal on line 705. Thus, when either the CMDWR or RAMRDWR signals go low or inactive, the flip-flop is clocked. The reset input to the flip-flop 700 is connected to the RST active low signal on line 706. The D-input to the flip-flop 700 is supplied across line 707 from the output of multiplexer 708. The multiplexer 708 is enabled to select its B input when the CS active low signal on line 709 goes high. The A input to the multiplexer 708 is the FCRSTQ signal on line 710 and the B input is the D14 input line on line 711. Thus, the multiplexer 708 supplies an input signal from the data bus line D14 when the CS signal is asserted and the FCRSTQ signal when the CS signal is not asserted, as the D-input to the flip-flop 700. The output of the flip-flop 700 is the FC signal stored by the control status register on line 712. During the token passing, the CMDWR signal is low, and the RAMRDWR signal is high until the end of a read or write cycle. When the RAMRDWR signal goes low, the flip-flop is clocked. This enables the flip-flop 700 to latch the output of the multiplexer 708. The output of the multiplexer 708 during the token passing stages will be the A input or the FCRSTQ signal on line 710. The generation of the FCSETQ signal on line 701 and the FCRSTQ signal on line 710 is described below with reference to FIGS. 27 and 28.

Figure 17:
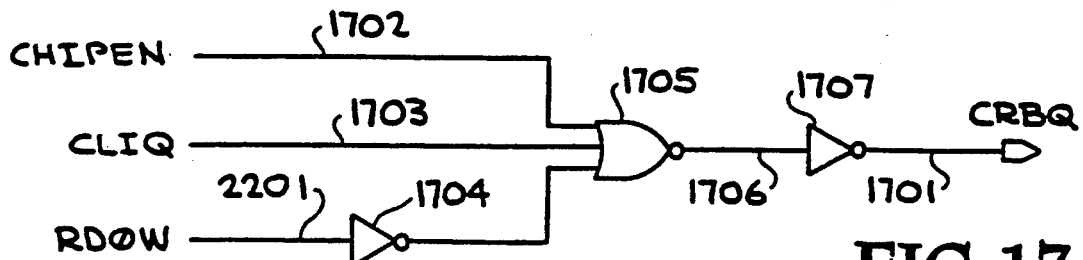
Figure 18:
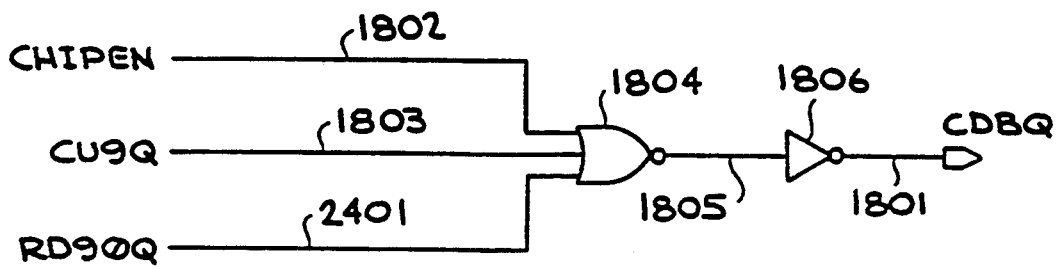

FIGS. 13–18 illustrate the generation of the six output signals generated in a cascade configuration from a single ORP. The output signals include CD9 (FIG. 13), CR0 (FIG. 14), CLO (FIG. 15), CU27 (FIG. 16), CRB (FIG. 17) and CDB (FIG. 18). FIGS. 19–26 illustrate logic generating some intermediate signals used in the generation of the output signals and the FCSETQ and FCRSTQ signal. The intermediate signals will be described first.

Figure 19:
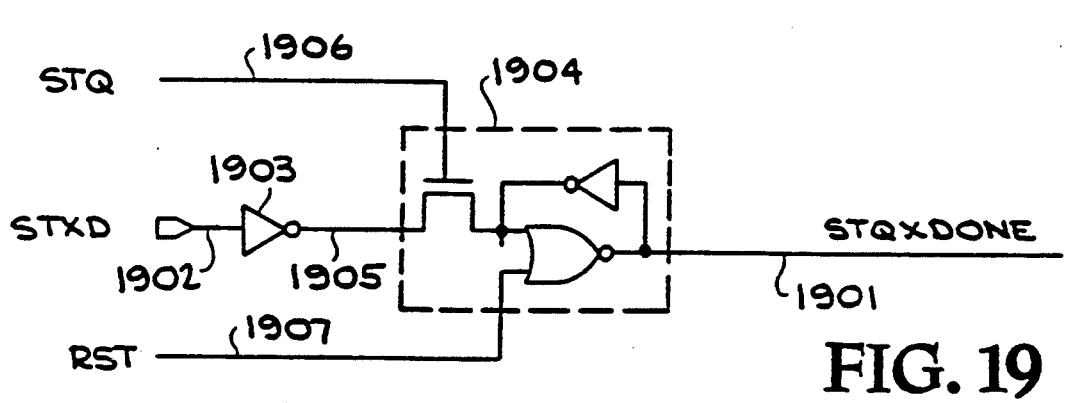

FIG. 19 shows the generation of the STQXDONE signal on line 1901. The inputs to this logic include the STXD signal which is generated out of the X limit comparator 50 as shown in FIG. 2B on line 1902. It is supplied through inverter 1903 as the input to latch 1904 on line 1905. The latch 1904 is clocked by the STQ signal supplied on line 1906. The latch is reset by the RST signal on line 1907. Therefore, the STQXDONE signal on line 1901 is a staged version of the STXD signal latched by the low cycle of ST and reset by the RST signal.

Figure 20:
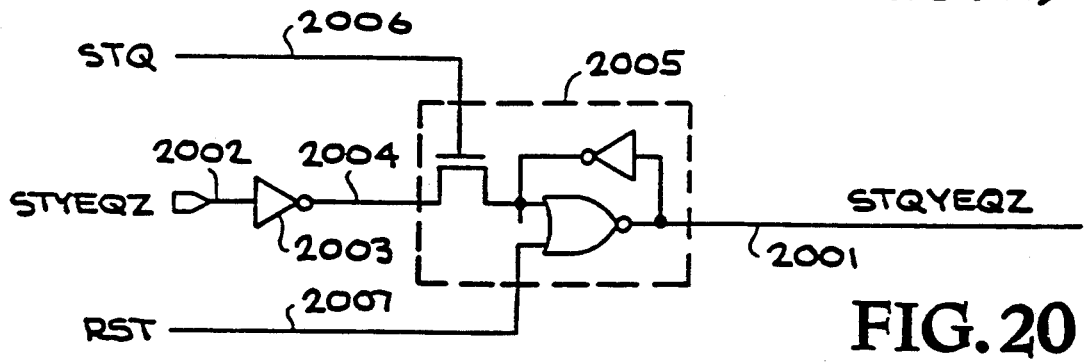

FIG. 20 illustrates the generation of the STQYEQZ signal on line 2001. The inputs to the circuit include the STYEQZ signal on line 2002 which is generated at the output of the Y limit decoder 42 as shown in FIG. 2B. The signal on line 2002 is supplied through inverter 2003 to line 2004 as the input to the latch 2005. The latch 2005 is clocked by the STQ signal on line 2006 and reset by the RST signal on line 2007. Therefore, the STQYEQZ signal on line 2001 is a staged version of the signal which is latched during the low cycle of ST and reset by the RST signal.

Figure 21:
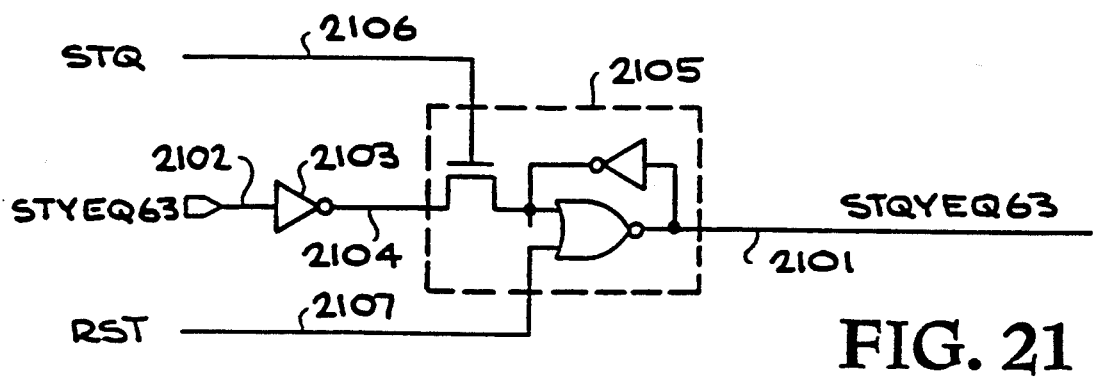

FIG. 21 illustrates the generation of the STQYEQ63 signal on line 2101. The inputs to the logic include the STYEQ63 signal on line 2102 which is generated at the output of the Y limit decoding logic 42 as shown in FIG. 2B. The signal on line 2102 is supplied through inverter 2103 across line 2104 as the input to the latch 2105. The latch is clocked by the STQ signal on line 2106 and reset by the RST signal on line 2107. Thus, the STQYEQ63 signal on line 2101 is a stage version of the STYEQ63 signal which is clocked during the low cycle of ST and reset by the RST signal.

Figure 22:
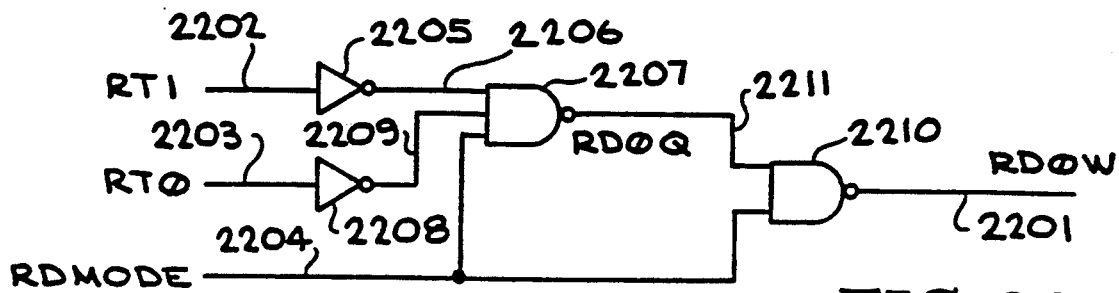

FIG. 22 illustrates the generation of the RD0W signal on line 2201. The inputs to this logic include the RT1 signal on line 2202, the RT0 signal on line 2203, and the RDMODE signal on line 2204. The RT1 signal on line 2202 is supplied through inverter 2205 as one input on line 2206 to NAND-gate 2207. The second input to NAND-gate 2207 is the RT0 signal supplied through inverter 2208 across line 2209. The third input to the NAND-gate 2207 is the RDMODE signal on line 2204. The output of NAND-gate 2207 is supplied as one input to NAND-gate 2210. The second input to NAND-gate 2210 is the RDMODE signal on line 2204. The output of the NAND-gate 2210 is equal to the RD0W signal on line 2201. Thus, the RD0W signal on line 2201 is high during a 0 degree read or a write operation. The output of the NAND-gate 2207 is the RD0Q signal on line 2211 which asserted active low during a 0 degree read.

Figure 23:
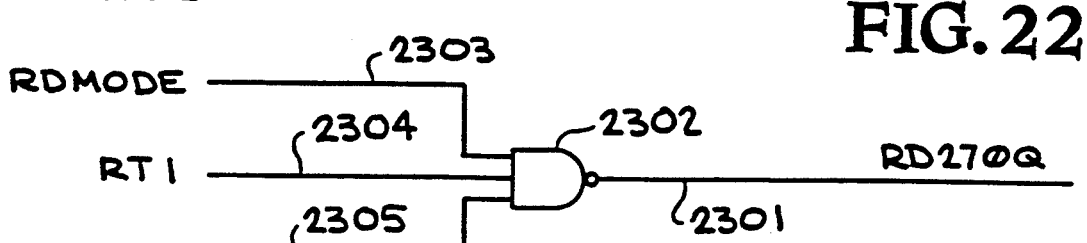

FIG. 23 illustrates the generation of the RD270Q signal on line 2301. The RD270Q signal is generated on line 2301 at the output of NAND-gate 2302. The inputs to NAND-gate 2302 include the RDMODE signal on line 2303, the RT1 signal on line 2304, and the RT0 signal on line 2305. Therefore, the RD270Q signal is asserted during a read mode when both RT1 and RT0 are high indicating a 270 degree read. The signal is active low.

Figure 24:
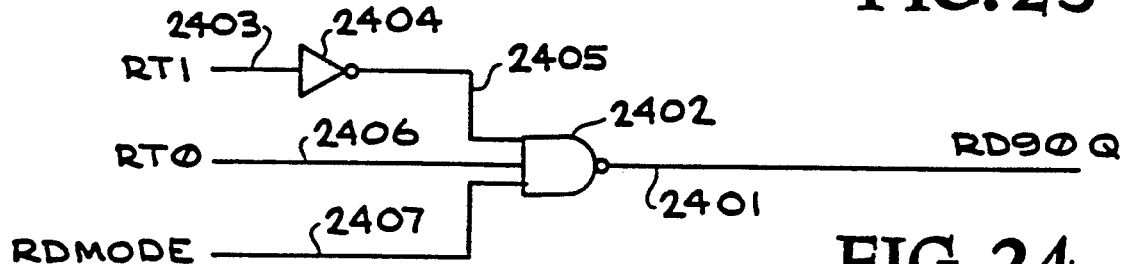

FIG. 24 illustrates the generation of the RD90Q signal on line 2401. The RD90Q signal is generated at the output of NAND-gate 2402. The inputs to NAND-gate 2402 include the RT1 signal on line 2403, supplied through inverter 2404 on line 2405. The second input to the NAND-gate 2402 is the RT0 signal on line 2406.

The third input is the RDMODE signal on line 2407. Therefore, the RD90Q signal, active low, is asserted when RT1 equal 0 and RT0 equal 1 during a read mode indicating a 90 degree read operation.

Figure 25:
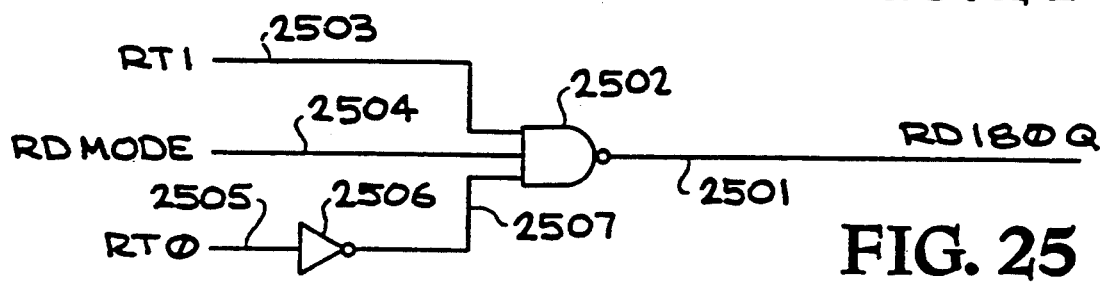

FIG. 25 illustrates generation of the RD180Q signal on line 2501. The RD180Q signal is generated at the output of NAND-gate 2502. The inputs to NAND-gate 2502 include the RT1 signal on line 2503, the RDMODE signal on line 2504 and the RT0 signal on line 2505 supplied through inverter 2506 on line 2507. Therefore, the RD180Q signal is asserted active low during a read mode when RT1 is 1 and RT0 is 0, indicating a 180 degree read.

Figure 26:
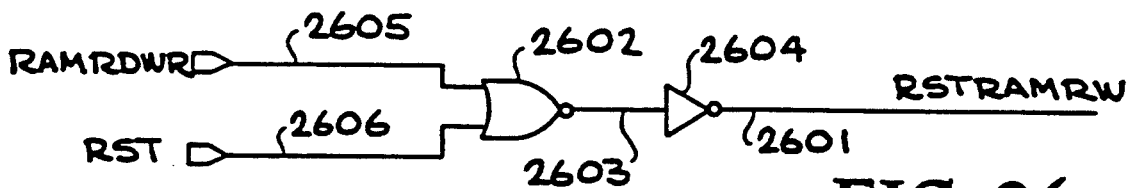

FIG. 26 illustrates generation of the RSTRAMRW signal on line 2601. The signal on line 2601 is supplied from the output of NOR-gate 2602 on line 2603 through inverter 2604. The inputs to NOR-gate 2602 include the RAMRDWR signal on line 2605 and the RST signal on line 2606. Therefore, the RSTRAMRW signal is asserted when the RST signal is true or the RAMRDWR signal is true.

The intermediate signals as discussed with reference to FIG. 19–26 are used in the generation of the output signals for the cascade logic and the FC set and FC reset signals discussed above.

Figure 13:
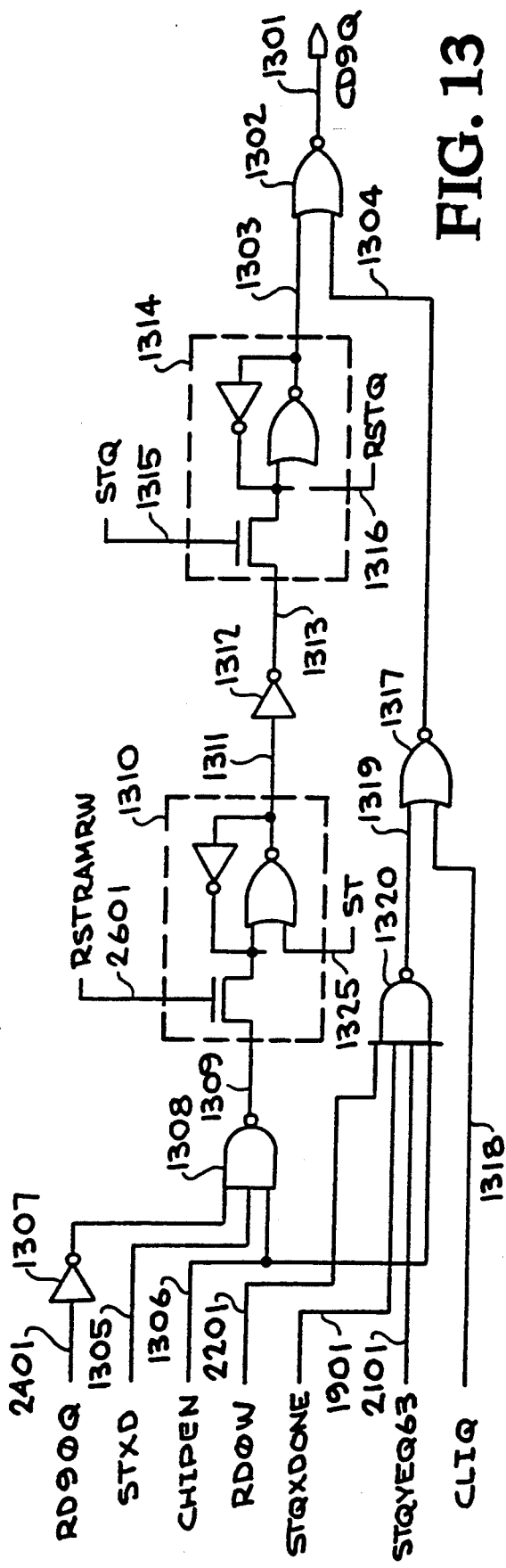

The output CD9 is generated on line 1301 as shown in FIG. 13. The CD9 signal active low is asserted at the output of NOR-gate 1302 in two conditions. The first condition is indicated by the signal on line 1303 which is one input to the NOR-gate 1302 and the second condition is indicated by the signal on line 1304 which is the second input to NOR-gate 1302. The signal on line 1303 is generated in response to the RD90Q signal on line 2401 generated as shown with respect to FIG. 24, the STXD signal generated by the X limit comparator 50 as shown in FIG. 2B on line 1305 and the CHIPEN signal from the control status register on line 1306. The RD90Q signal on line 2401 is supplied through inverter 1307 as one input to NAND-gate 1308. The second input to NAND-gate 1308 is the STXD signal on line 1305 and the CHIPEN signal on line 1306. Thus, the output of the NAND-gate 1303 is asserted active low during a 90 degree read at the end of the cycle of the X address generating counter when the chip is enabled. The output of the NAND-gate 1309 is latched in the inverting latch 1310 upon the assertion of the RSTRAMRW signal on line 2601 generated as shown with respect to FIG. 26. The latch 1310 is reset by the ST signal on line 1325. The output of the latch 1310 is supplied across line 1311 through inverter 1312 across line 1313 into a second latch 1314. The second latch is latched by the STQ signal on line 1315. The second latch 1314 is reset by the RST signal on line 1316. Latches 1310 and 1314 operate to stage the signal on line 1309 during a RAM read/write or a reset operation when ST is low. The latch 1314 stages the output of the latch 1310 during the low cycle of the ST signal. Thus, the signal on line 1303 indicates a condition in which the horizontal counter cycle of a 90 degree read is completed during a previous ST high condition.

The signal on line 1304 is generated at the output of NOR-gate 1317. The inputs to NOR-gate 1317 include the CLI active low signal on line 1318 and the signal on line 1319. The signal on line 1319 is supplied at the output of NAND-gate 1320. The inputs to NAND-gate 1320 include the RD0W signal on line 2201, the STQXDONE signal on line 1901, the STQYEQ63 signal on line 2101 and the CHIPEN signal on line 1306.

Figure 27:
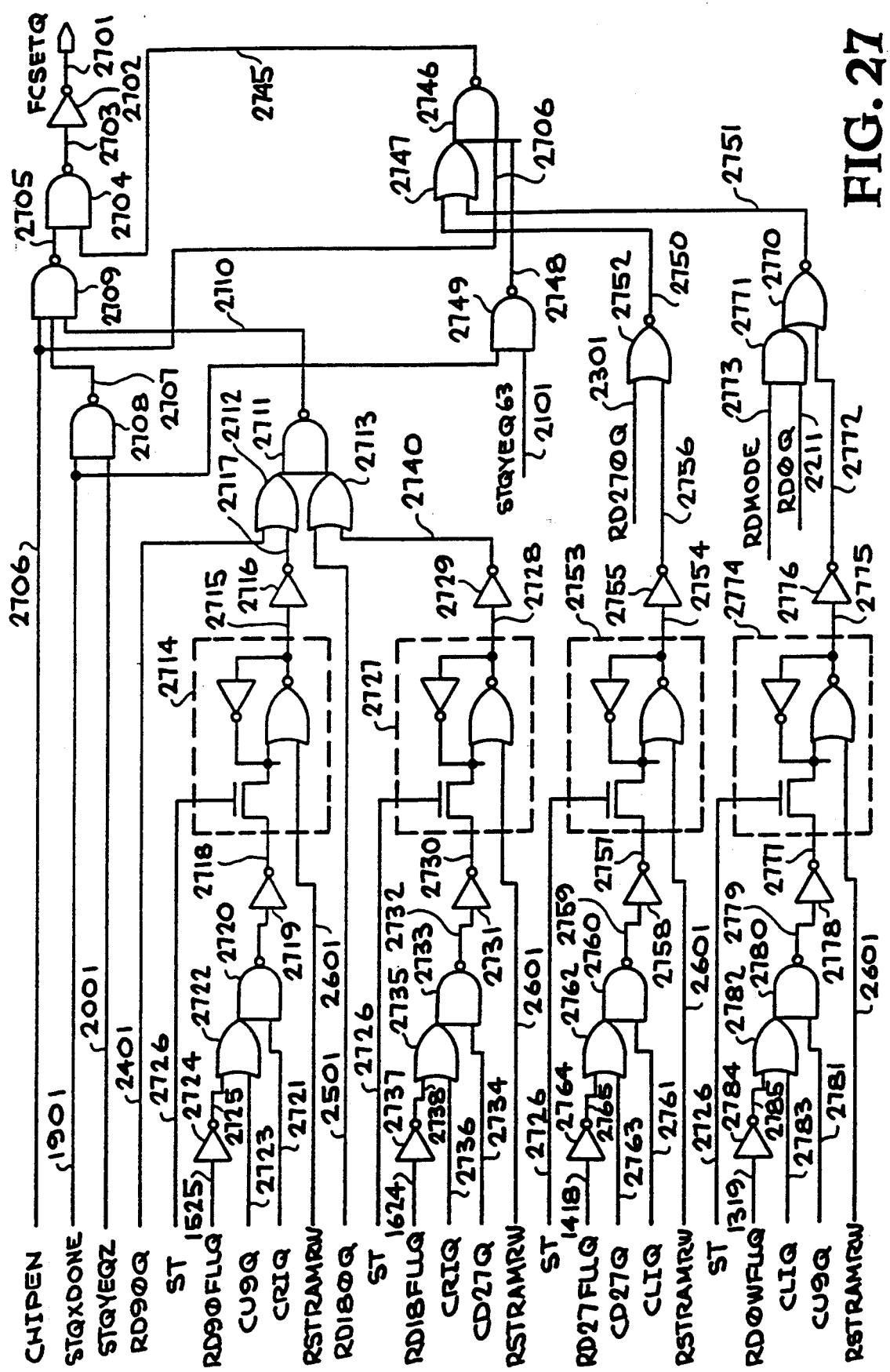

Thus, the output of NAND gate 1320 on line 1319 is asserted during a 0 degree read or write when both the X and Y counters are completed during a previous high cycle of ST. This signal on line 1319 is supplied as the RD0WFLLQ signal to the logic generating the FCSETQ signal as shown in FIG. 27. The signal on line 1304 is asserted when the CLI signal is asserted and when both the X and Y counters complete their cycle during a 0 degree read or write.

Accordingly, the cascade control signal CD9 active low is asserted on line 1301 during a 90 degree read at the end of each logical row of XAR (up to four) words; during a write when the entire data array has been written or during a 0 degree read when the entire data array has been read.

Figure 14:
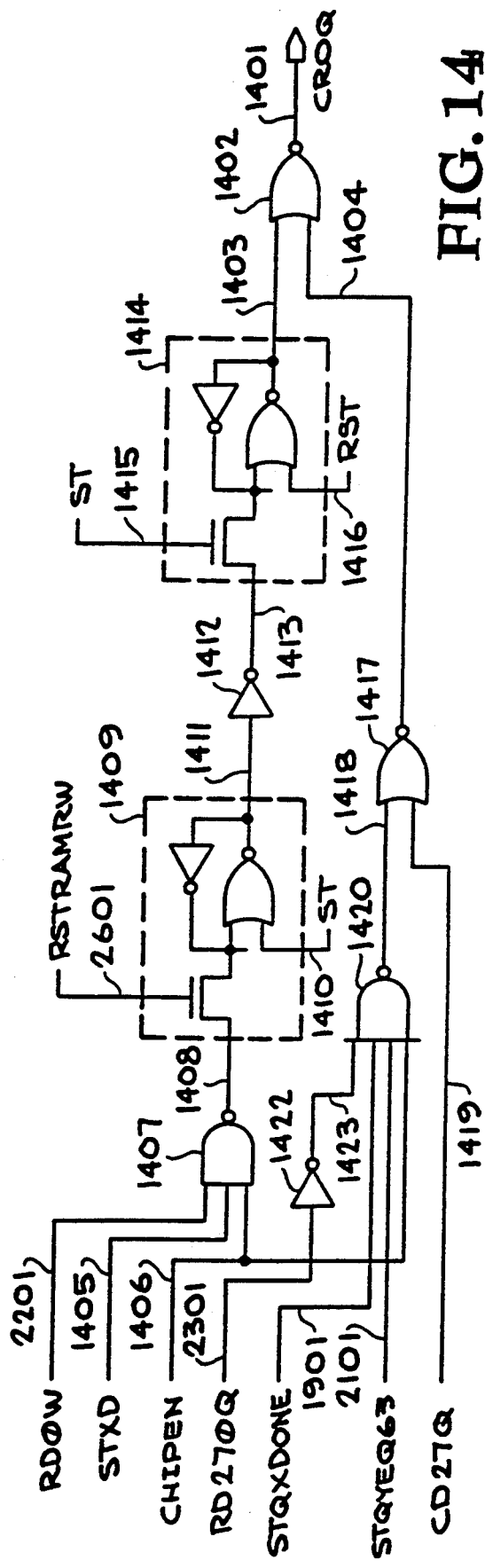

FIG. 14 illustrates the generation of the CRO signal on line 1401. The CRO signal on line 1401 is generated at the output of NOR-gate 1402. The inputs to NOR-gate 1402 include the signal on line 1403, and the signal on line 1404. The signal on line 1403 is generated in response to the RD0W signal on line 2201, the STXD signal on line 1405 and the CHIPEN signal on line 1406, each of which are supplied as an input to NAND-gate 1407. The output of the NAND-gate 1407 on line 1408 is supplied to latch 1409 which is clocked by the RSTRAMRW signal on line 2601. The latch 1409 is reset by the ST signal on line 1410. The output of the latch 1409 is supplied across line 1411 through inverter 1412 to line 1413 as an input to a second latch 1414. The second latch 1414 is clocked by the STQ signal on line 1415 and reset by the RST signal on line 1416. Thus, the signal on line 1403 is asserted during the low cycle of ST during a 0 degree read or write when the STXD signal was asserted during a previous RAM read or write.

The signal on line 1404 is generated at the output of NOR-gate 1417. The inputs to NOR-gate 1417 include the signal on line 1418 and the signal on line 1419. The signal on line 1419 is the CD27 active low input. The signal on line 1418 is supplied at the output of NAND-gate 1420. The inputs to NAND-gate 1420 include the RD270Q signal on line 2301 supplied through inverter 1422 to line 1423. In addition, the STQXDONE on line 1901, the STQYEQ63 on line 2101 and the CHIPEN on line 1406 are inputs to NAND-gate 1420. Thus, the NAND-gate 1420 asserts a signal on line 1418 active low during a 270 degree read when both the X and Y directions have been completed for the ORP. The signal on line 1418 is supplied as the RD27FLLQ signal for the generation of the FCSETQ signal as shown in FIG. 27. Thus, the signal on line 1404 is asserted when the CD27 signal is asserted and when the RD27FLLQ signal on line 1418 is asserted. Since the CD27 signal on line 1419 is active low when it is asserted, the output of the NOR-gate 1417 is controlled by the signal on line 1418.

Accordingly, the signal on line 1401 CRO active low is asserted during a 0 degree read or write at the end of each logical row of XAR words and during a 270 degree read when the entire chip has been read and the CD27 signal is asserted.

FIG. 15 illustrates the logic used to generate the CLO signal on line 1501. The CLO signal is generated active low at the output of NOR-gate 1502 on line 1501 in response to three signals. The three signals are generated on lines 1503, 1504 and 1505, respectively. The signal on line 1503 is generated in response to the RD180Q signal on line 2501, the STXD signal on line 1506, and the CHIPEN signal on line 1507. The RD180Q signal on line 2501 is supplied through inverter 1508 to line 1509 as a first input to NAND-gate 1510. The STXD on line 1506 and CHIPEN on line 1507 signals are both supplied as inputs to NAND-gate 1510 as well. The output of NAND-gate 1510 is supplied on line 1511 as an input to a first latch 1512. The first latch 1512 is clocked by the RSTRAMRW signal on line 2601 and reset by the ST signal on line 1513. The output of the latch 1512 on line 1514 is passed through inverter 1515 on line 1516 as an input to a second latch 1517. The second latch is clocked by the STQ signal on line 1518 and reset by the RST signal on line 1519. The output of the latch 1517 is a signal 1503 indicating the completion of a logical row of XAR words in a 180 degree read during a previous ST high cycle.

The signal on line 1504 is generated at the output of NOR-gate 1520. The inputs to NOR-gate 1520 include the CU9 signal on line 1521 and the output of NAND-gate 1522 on line 1525. The inputs to NAND-gate 1522 include the RD90Q signal on line 2401 through inverter 1523 to line 1524. In addition, the STQXDONE signal on line 1901, the STQYEQZ signal on line 2001 and the CHIPEN signal on line 1507 are inputs to NAND-gate 1522. The output of the NAND-gate 1522 on line 1525 is supplied as a second input to NOR-gate 1520. Thus, the output of the NOR-gate 1520 is asserted on line 1504 active high in response to the CU9 signal on line 1521 and the output of NAND-gate 1522 on line 1525 during a 90 degree read on the assertion of the STQXDONE signal and the STQYEQZ signal on line 2001 indicating the completion of a countdown mode in a previous ST high cycle for the Y generating logic counter and the completion of the counting mode for the X generating logic as well. The signal on line 1522 is the RD90FLLQ signal which is used in the generation of the FCSETQ signal as shown in FIG. 27.

The signal on line 1505 is generated at the output of NOR-gate 1527. The inputs to NOR-gate 1527 include the CHIPEN signal on line 1507, the RD180Q signal from line 2501 and the CRB signal on line 1526. When the CHIPEN signal is asserted or when not in a 180 read mode, the output of the NOR-gate 1527 is always low. When the CHIPEN signal is not asserted, during a 180 degree read, the CRB signal is passed through the output on line 1505.

Accordingly, the CLO signal active low on line 1501 is asserted in the ST low cycle after completion of an XAR word row during a 180 degree read, at the completion of the read of the entire data array for the ORP during a 90 degree read when the CU9 signal is asserted, and during a 180 degree read when the CRB signal is asserted and the chip is not enabled.

FIG. 16 illustrates the generation of the CU27 signal on line 1601. The CU27 signal on line 1601 is generated at the output of NOR-gate 1602. The inputs to NOR-gate 1602 include signals on line 1603, 1604 and 1605. The signal on line 1603 is generated in response to the RD270Q signal on line 2301, the STXD signal on line 1606 and the CHIPEN signal on line 1607. The RD270Q signal on line 2301 is supplied through inverter 1608 on line 1609 as one input to NAND-gate 1610. Other inputs to NAND-gate 1610 include STXD signal on line 1606 and the CHIPEN signal on line 1607. The output of the NAND-gate 1610 on line 1611 is supplied as input to the latch 1612 which is clocked by the RSTRAMRW signal on line 2601 and reset by the ST signal on line 1613. The output of the latch 1612 is supplied on line 1614 through inverter 1615 across line 1616 as an input to a second latch 1617. The second latch 1617 is clocked by the STQ signal on line 1618 and reset by the RST signal on line 1619. The output of the latch 1617 is a signal on line 1603 indicating the end of reading of the logical row in the ORP during a 270 degree read in a previous high cycle of the ST signal.

The signal on line 1604 is generated in response to the CHIPEN signal on line 1607, the STQXDONE signal on line 1901 and the STQYEQZ signal on line 2001, all of which are supplied as inputs to NAND-gate 1621. The fourth input to NAND-gate 1621 is the RD180Q signal on line 2501 supplied through inverter 1622 on line 1623. The output of NAND-gate 1621 as supplied on line 1624 is asserted active low during a 180 degree read after completion of reading the entire data array from the ORP. The signal designated the RD180FLLQ signal on line 1624 is used in the generation of the FCSETQ signal as shown in FIG. 27. The signal on line 1624 is supplied also as one input to NOR-gate 1625. The second input to NOR-gate 1625 is the CRI signal on line 1620 active low. The output of the NOR-gate 1625 is the signal on line 1604 which when the chip is enabled indicates the completion of a 180 degree read of the entire data array of a previous high cycle of the ST signal.

The signal on line 1605 is generated at the output of NOR-gate 1626. The inputs to NOR-gate 1626 include the CHIPEN signal on line 1607, the RD270Q signal on line 2301 and the CDB signal on line 1627. The output of the NOR-gate 1626 is asserted on line 1605 when the chip is not enabled during a 270 degree read operation to pass through the CDB signal on line 1627.

Thus, the signal on line 1601 is asserted at the completion of reading a row during the 270 degree read operation, at the completion of reading the entire array from the ORP during a 180 degree read operation, and the CRI signal is asserted, and to pass through the CDB signal during a 270 degree read, when the chip is not enabled.

FIG. 17 illustrates the generation of the CRB signal on line 1701. The CRB signal is generated in response to the CHIPEN signal on line 1702, the CLI signal on line 1703 and the RD0W signal on line 2201. The RD0W signal is supplied through inverter 1704 as one input to NOR-gate 1705. The other inputs to NOR-gate 1705 include the CHIPEN signal on line 1702 and the CLI signal on line 1703. The output of the NOR-gate 175 is asserted on line 1706 through inverter 1707 as the CRB output signal on line 1701. Thus, the CRB output signal on line 1701 is asserted active low, during a 0 degree read or write when the chip is not enabled and the CLI signal is asserted.

FIG. 18 illustrates the generation of the CDB output signal on line 1801. The CDB output signal on line 1801 is generated in response to the CHIPEN signal on line 1802, the CU9 input signal on line 1803 and the RD90Q signal on line 2401. Each of these signals is supplied as an input to NOR-gate 1804. The output of NOR-gate 1804 is supplied on line 1805 through inverter 1806 as the CDB output signal active low. Thus, the CDB output signal is asserted during a 90 degree read when the chip is not enabled and the CU9 input signal is asserted.

Figure 28:
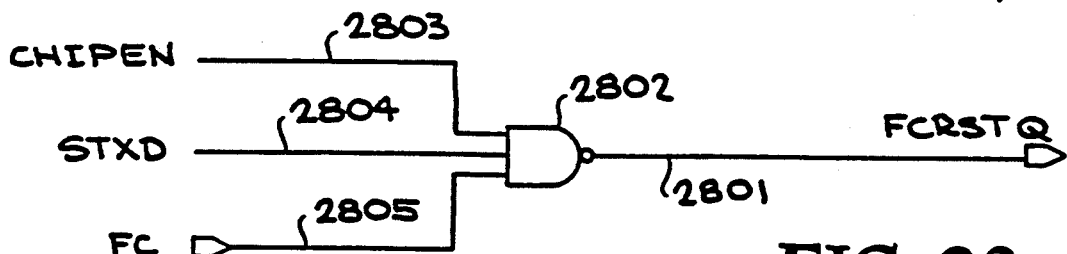

The signals generated as discussed above with regard to FIGS. 13–18 as well as the internal signals described with regard to FIGS. 19–26, are used in the generation of the FCSETQ signal and the FCRSTQ signal as shown in FIGS. 27 and 28. As mentioned with regard to FIG. 3, the FC signal in combination with the CHIPEN signal, is necessary to enable the ORP to perform a RAM read or write operation (see lines 137 and 138 in FIG. 3). In the cascade configuration, the passing of the FC token controls which chip in the cascade array is operable at a given time.

Figure 30:
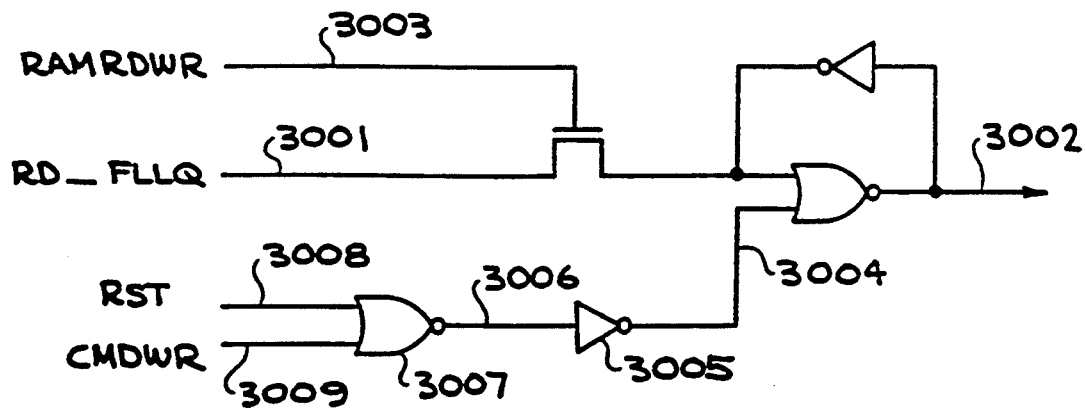
FIG. 30 is a logic diagram of a latched inverter used in the circuit of FIG. 27.

FIG. 27 illustrates the generation of the FCSETQ signal on line 2701 active low. The signal on line 2701 is supplied through inverter 2702 from the output 2703 of NAND-gate 2704. The signal on line 2701 is asserted active low when either inputs to NAND-gate 2704 are low. The first input to NAND-gate 2704 is a signal on line 2705 which is enabled while CHIPEN is high as indicated on line 2706 and the signals STQXDONE on line 1901 and STQYEQZ on line 2001 are not asserted high together as indicated by the signal on line 2707 at the output of NAND-gate 2708. The third input to the NAND-gate 2709 is a signal on line 2710. The signal on line 2710 is supplied at the output of NAND-gate 2711. Inputs to NAND-gate 2711 are supplied at the outputs of OR-gates 2712 and 2713. The inputs to OR-gate 2712 include the RD90Q signal on line 2401 and the output of latch 2714 supplied on line 2715 through inverter 2716 across line 2717. The input to the latch 2714 is supplied on line 2718 at the output of inverter 2719. The input to inverter 2719 is the output of the NAND-gate 2720. The inputs to NAND-gate 2720 include the CRI signal on line 2721 and the output of OR-gate 2722. The input to OR-gate 2722 is the CU9 signal on line 2723 and the RD90FLLQ signal from line 1525 supplied through latched inverter 2724 on line 2725. Latched inverters 2724, 2737, 2764 and 2784 of FIG. 27 are implemented as shown in FIG. 30, discussed below. Latch 2714 is clocked by the ST signal on line 2726 and reset by the RSTRAMRW signal on line 2601. The input to the latch 2714 on line 2718 is low when the CRI signal on line 2721 is asserted or the CU9 signal on line 2723 is not asserted, or when the CRI signal on line 2721 is not asserted and the RD90FLLQ signal is not asserted, indicating that a 90 degree read has not been completed for the ORP during a previous ST high cycle and CU9 signal on line 2723 is asserted.

The output of OR-gate 2713 is low when the system is doing a 180 degree read as indicated by the signal across line 2501 and by the signal supplied at the output of the latch 2727 across line 2728 through inverter 2729 on line 2740. The latch 2727 is set by the ST signal on line 2726 and reset by the RSTRAMRW signal on line 2601. The input is supplied at the output of inverter 2731 on line 2730. The input to inverter 2731 is the output on line 2732 of NAND-gate 2733. The inputs to NAND-gate 2733 include the CD27 signal on line 2734 and the output of OR-gate 2735. The inputs to OR-gate 2735 include the CRI signal on line 2736 and the RD18FLLQ signal on line 1624 supplied through latched inverter 2737 across line 2738. Thus, the input to the latch 2727 is asserted active low when either CD27 is asserted or CRI is asserted and the 180 degree read has not been completed for a given ORP as indicated by the RD180FLLQ signal on line 1624. The signal is propagated through the latch 2727 in these two conditions during a following ST high cycle as input on line 2740 to OR-gate 2713. Therefore, the signal on line 2710 controls the passing of the token during a 90 or a 180 degree read operation.

The second input to the NAND-gate 2704 is the signal on line 2745 supplied at the output of NAND-gate 2746. The inputs to NAND-gate 2746 include the output of OR-gate 2747, the CHIPEN signal on line 2706 and the signal on line 2748 supplied at the output of NAND-gate 2749. The inputs to NAND-gate 2749 include the STQYEQ63 signal on line 2101 and the STQXDONE signal on line 1901. Thus, the output of the NAND-gate 2749 is asserted until the completion of a countup cycle for the Y address generating counter and the completion of the counting cycle for the X address generating cycle.

The inputs to OR-gate 2747 include the signal on line 2750 and on line 2751. The signal on line 2750 is generated at the output of NOR-gate 2752. The inputs to NOR-gate 2752 include the RD270Q signal on line 2301 and the output of latch 2753 which is supplied on line 2754 through inverter 2755 across line 2756. The latch 2754 is clocked by the ST signal on line 2726 and reset by the RSTRAMRW signal on line 2601. The input is supplied on line 2757 at the output of inverter 2758 which receives its input across line 2759 from NAND-gate 2760. The inputs to NAND-gate 2760 include the CLI signal on line 2761 and the output of OR-gate 2762. The inputs to OR-gate 2762 include the CD27 signal on line 2763 and the RD27FLLQ signal on line 1418 supplied through latched inverter 2764 across line 2765. Thus, it can be seen that the signal on line 2750 controls the passing of the token during a 270 degree read operation.

The signal on line 2751 is generated at the output of NOR-gate 2770. The inputs to NOR-gate 2770 include the output of AND-gate 2771 and the signal on line 2772. The inputs to the AND-gate 2771 include the RD0Q signal on line 2211 and the RDMODE signal on line 2773 which is generated by the read/write control logic. Thus, the output of the AND-gate 2771 is high only when a 0 degree read or a write is not being performed.

The signal on line 2772 is supplied from latch 2774 across line 2775 through inverter 2776. The input to the latch 2774 is the signal on line 2777 supplied at the output of inverter 2778. The input to inverter 2778 is the signal on line 2779 supplied at the output of NAND-gate 2780. The inputs to NAND-gate 2780 include the CU9 signal on line 2781 and the output of OR-gate 2782. The inputs to the OR-gate 2782 include the CLI signal on line 2783 and the RD0WFLLQ signal on line 1319 supplied through latched inverter 2784 on line 2785. Latch 2774 is clocked by the ST signal on line 2726 and reset by the RSTRAMRW signal on line 2601. Thus, it can be seen that the signal on line 2751 is controlled as the passing of the token during a 0 degree read or write.

FIG. 30 illustrates the implementation of the latched inverters 2724, 2737, 2764 and 2784 of FIG. 28. The input to each of the inverters corresponds to line 3001, and the output of each of the inverters corresponds to line 3002. The latched inverter shown in FIG. 30 works to latch the signal applied on the line 3001 during the RAMRDWR signal high cycle which is supplied to the inverter across line 3003. The latched inverter shown in FIG. 30 is reset in response to the signal on line 3004 which is supplied at the output of the inverting buffer 3005. The input to the inverting buffer 3005 is supplied on line 3006 at the output of NOR-gate 3007. The inputs to NOR-gate 3007 include the RST signal on line 3008 and the CMDWR signal on 3009. The latched inverters serve to hold the respective RD_FLLQ signals during a cascaded operation until the entire array of ORPs has been fully read or written to. Thus, it is reset when the control status register is rewritten r when a reset signal is asserted.

FIG. 28 illustrates the generation of the FCRSTQ signal on line 2801. The signal on line 2801 is generated at the output of NAND-gate 2802. The inputs to NAND-gate 2802 include the CHIPEN signal on line 2803, the STXD signal on line 2804 which is generated at the output of the X limit comparator as shown in FIG. 2B and the FC signal supplied from the control status resister across line 2805. Therefore, the FCRSTQ signal on line 2801 is asserted active low when the chip is enabled and the FC token is high for the chip at the end of each cycle of the X address generating counter.

I. Operational Cascade Control Logic

The ORP can be cascaded in any number in both the horizontal and vertical directions. Cascade control logic supports a 0 degree read and write operation, a 90 degree read operation, a 180 degree read operation and a 270 degree read operation.

1. Write Operation

To support a write operation, the CRO output for a first ORP in a row is connected to the CLI input for the second ORP in a row and so on until the last ORP in the row. The CRO output for the last ORP in a row is connected through a buffer back to the CLI input for the first ORP in the row. To start, the FC bit in the first ORP1 is set to 1 by the external controlling CPU. The FC bit in all other ORPs is set to zero. After loading four words in ORP1, the CR0 output of ORP1 is driven low. In response, the FC bit in ORP2 is set high, and the process is repeated until the entire memory area for all ORPs in the row is full. When the entire memory area is loaded for ORP1, the CLI input is connected internally directly to CD9 output. When the last ORP in a row, ORP3 is full, the CRO output goes low, driving the CLI input of ORP1 low. This signal is propagated through the CD9 output of ORP1 to the CU9 input of ORP4 in the second row, causing the FC bit of ORP4 to be set to 1. Then the FC bit is propagated along ORP4, ORP5 and ORP6 until all three memory arrays in that row are full. Next, the FC token is passed to ORP7 and the final row is filled with data.

If the size of an image block to be written to the cascaded ORPs is smaller than the entire cascade configuration; for instance, 128 by 128 bits, ORP3, ORP6, ORP9, ORP8 and ORP7 must be set to the disabled state by programming the CHIPEN bit of each ORP to zero. Under this condition, the CLI input of each disabled chip is connected internally to the CRB pin. This prevents the FC bit from ever being set in that chip. Further, as can be seen in FIG. 29, the CRO output of ORP2 is connected to the CLI input of ORP3 which, because it is not enabled, is connected directly to the CRB output of ORP3. This causes propagation of the CRO output of ORP2 back to the CLI input of ORP1. This operation is used in the read modes as well.

2. 0 Degree Read Operation

In the 0 degree read operation, the propagation of the FC token is exactly the same as discussed above for the write operation.

3. 90 Degree Read Operation

In the 90 degree read operation, the CLO signal and CRI signal are used to propagate the FC token in the vertical direction. These signals correspond to the CD9 and CU9 signals used during the write operation. The CDB signal is defined as an output in this case. During the 90 degree read, the CD9 output is driven low after all four words accessed in response to the XAR bits are read out of the chip. This drives the next ORP in the column's input signal CU9 low. The last ORP in the column; for example, ORP9, connects its output CD9 through an open drain buffer back to the CU9 input of the top ORP in the column, ORP3. The algorithm starts by the external CPU when it sets the FC bit in the upper right hand ORP, ORP3 to 1, and the FC bit in all other ORPs to 0. When all the data is read out of the column on the rightmost side of the array, ORP3, ORP6, ORP9, the CU9 output is connected internally to the CLO output. Thus, when the final data is read from ORP9, the CD9 output of ORP9 is driven low, driving input CU9 of ORP3 low. This signal CU9 of ORP3 is propagated and the FC bit is passed to ORP2. When all of the data is read out of the column consisting of ORP2, ORP5 and ORP8, then the token is passed to ORP1 and the process is repeated.

4. 180 Degree Read Operation

In the 180 degree read operation, the signals CU27 and CD27 are used to propagate the FC bit in the vertical direction. The CRB signal is defined as an input. The CRI, CLO and CRB signals are used to propagate the FC bit in the horizontal direction. In the 180 degree read operation, the bottom right ORP (ORP9), is programmed with the FC bit 1 to initialize the read. All other ORPs have their FC bits set to 0. The CLO output of each chip (ORP9) is connected to the CRI input of the chip immediately to its left. The leftmost chip in a row is fed back through its CLO output and a buffer to the CRI input of the rightmost chip in a row. The FC token is passed by driving the CLO output low after reading 4 words defined by the XAR value from left to right. When the entire chip is read, the token is passed from the rightmost ORP in the cascade to the next row in the vertical direction. This is accomplished by connecting the CRI input directly to the CU27 output internally. Thus, when the final data is read from ORP7, the CU27 output of ORP9 is driven low in response to the low output of the CLO output of ORP7, driving CRI input of ORP9 low. This transfers the FC token to ORP6. This process is repeated until the entire array is read.

5. 270 Degree Read Operation

For a 270 degree read operation, the CD27 input and the CU27 output and the CRO output and the CLI inputs are used to pass the cascade token FC. The operation begins with the lower lefthand ORP7. After the four words are written as defined by the XAR bits in the X address generation logic, the CU27 signal is driven low, passing the FC token to the next ORP up a column, ORP4 and so on until the token is passed to ORP1. The CU27 output of ORP1 is connected through an open drain buffer to the CD27 input of ORP7. When the entire data array is read from ORP7, the CD27 input is connected to the CRO output internally in ORP7. Thus, when the CU27 signal is driven low by the ORP1 indicating completion of the read from the array in ORP1, the CRO signal on ORP7 is driven low, passing the cascade token to ORP8. The process is repeated until the 270 degree read operation is complete.

As can be seen, the CLO signal is asserted under three conditions. First, during a 90 degree read when the chip is enabled, all memory of the chip has been accessed and the CU9 signal is asserted. The CLO is also asserted during a 180 degree read operation when the chip is enabled and a horizontal row of data has been accessed as defined by the X address generator. Also, CLO is asserted when the chip is not enabled during a 180 degree read and CRB signal is asserted.

The CRO signal is asserted during three conditions: first, when a horizontal row of data has been accessed as defined by the X address generator during a write and the chip is enabled; second, during a 0 degree read after all horizontal data words have been read from a given row defined by the X address generator and the chip is enabled; and third, during a 270 degree read after all data is read from the memory, the chip is enabled and the CD27 signal is asserted.

The CU27 signal is asserted during three conditions as well. The first condition occurs during a 270 degree read when all horizontal words have been read from the array. The second condition occurs during a 180 degree read after all data has been read from the array of an enabled ORP and its CRI input is asserted. The third condition occurs during a 270 degree read when the CDB signal is asserted and the chip is not enabled.

The CD9 signal is asserted under three conditions as well. The first is when the CLI signal is asserted, all data has been accessed from the array during a write and the chip is enabled. The second condition occurs when a horizontal row of words has been read during a 90 degree read and the chip is enabled. The final condition occurs during a 0 degree read when all data has been accessed from the array, the CLI signal is asserted and the chip is enabled.

The CRB signal is asserted when the CLI signal is asserted during a write and the chip is not enabled, or during a 0 degree read when the CLI input is asserted and the chip is not enabled.

The CDB signal is asserted when the CU9 signal is asserted during a 90 degree read and when the chip is not enabled.

CONCLUSION

The foregoing description of a detailed embodiment describes an integrated circuit accomplishing orthogonal rotation of a bit-map image quickly and automatically. The ORP is based on the use of a memory array that is accessible in either a normal or rotated mode providing normal or rotated words of data in response to input addresses and control signals. The ORP provides for rapid rotation of 0 degrees, 90 degrees, 180 degrees or 270 degrees for any bit-map image stored.

In addition, the functionality of the ORP is increased by four unique features. First, the generation of address sequences is controlled by a logical image size defined by the XAR and YAR bits in the control status register. The ORP generates a sequence of physical memory addresses suited to a particular rotation mode based on the logical image size.

Second, the ORP is cascadable without any significant speed penalty. The cascading is accomplished by a token passing apparatus which operates in each of the rotation modes to effectively extend the size of the memory array subject of the rotation process. Further, the cascade feature operates while maintaining the ability to define an image size logically. The ORPs in a cascade array that are outside the working area of the memory are disabled without interfering with cascade token passing.

Third, the ORP provides for automatic data masking of rotated images based on the logical image size. Because the horizontal image block is defined by word boundaries and the vertical image block is defined by bit boundaries, when an image is rotated in 90 or 270 degrees, to the extent that the vertical size does not fall on a word boundary, data of unknown or unwanted value may be read. Thus, the automatic masking feature assures that all zeros are provided in the area outside the logical image size by masking. Therefore, the system does not need to clear the ORP memory before it writes data.

Finally, the ORP provides for automatic address management during a clipping operation. In the case that a reading process is terminated before an entire image has been read from the data array, the ORP sets a CLIP control bit to 1 in the control status register. The logical image size parameters XAR and YAR stored in the control status register are updated to hold the remaining logical image size and the start position for use when the reading process is resumed.

The preferred embodiment of the present invention has been directed to a system that provides for rotation in 90 degree increments. Those skilled in the art will appreciate that rotation in increments of other sizes can be implemented by a special adaptation of the SRAM array to accommodate other reading modes. For instance, an additional port could be configured to the SRAM array to provide for a 45 degree rotation.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. An apparatus for receiving input data nd for supplying output data, comprising:

storing means, connected to receive the input data nd array addresses, for storing the input data, the storing means including an array of data locations storing respective units of the input data, the data locations being accessible for supplying output data in a moral mode and a rotated mode, the normal mode accessing normal sets of data locations in response to array addresses and the rotated mode accessing rotated sets of data locations in response to array addresses, wherein the array includes at least $R+1$ normal sets, and a normal set includes a word of data having $N+1$ units, $NU_n$, for n equal to 0 through N, an a rotated set includes a word of data having $R+1$ units, where a given rotated set includes one unit $NU_n$, from each of $R+1$ normal sets;

control means for supplying mode control signals;

generating means, connected to the control means and responsive to the mode control signals, for generating sequences of array addresses in the normal mode and the rotated mode and supplying the generated sequences of array addresses to the storage means, the normal mode generating sequences of array addresses for accessing normal sets of data locations and the rotated mode generating sequences of array addresses for accessing rotated sets of data locations.

2. The apparatus of claim 1, wherein the generating means further includes:

means for generating sequences of array addresses in an opposite normal mode and an opposite rotated mode, the opposite normal mode generating sequences of addresses for accessing the normal sets and the opposite rotated mode generating sequences of array addresses for accessing he rotated sets.

3. The apparatus of claim 2, further including:
means, connected to receive accessed normal and rotated sets from the storing means and responsive to mode control signals, for supplying the accessed sets as output data, including
means for transposing the units of accessed sets in the opposite normal mode and the opposite rotated mode.

4. The apparatus of claim 1, wherein the input data is a bit map of an image having a normal orientation and the normal sets store units of data in the bit map according to the normal orientation and the rotated sets store units of data in the bit map according to a rotated orientation that is rotated 90 degrees with respect to the normal orientation.

5. The apparatus of claim 4, wherein:
the generating means further includes means for generating sequences of array addresses in an opposite normal mode and an opposite rotated mode, the opposite normal mode generating sequences of addresses for accessing the normal sets and the opposite rotated mode generating sequences of array addresses for accessing he rotated sets; and
the sequences of array addresses generated in the normal mode access the storing means according the normal orientation,
the sequences of array addresses generated in the rotated mode access the storing means according to the 90 degree rotated orientation,
the sequences of array addresses generated in the opposite normal mode access the storing means according to a 180 degree rotated orientation, and
the sequences of array addresses generated in the opposite rotated mode access the storing means according to a 270 degree rotated orientation.

6. The apparatus of claim 5, further including:
means, connected to receive accessed normal and rotated sets from the storing means and responsive to mode control signals, for supplying the accessed sets as output data, including
means for transposing the units of accessed sets in the opposite normal mode and the opposite rotated mode.

7. The apparatus of claim 5, the control means includes:
control interface means, adapted to receive the control signals, for supplying the control signals to the generating means and wherein the control signals include logical image size data specifying a logical X dimension on set boundaries and a logical Y dimension on line boundaries wherein the normal sets are addressed along a normal dimension in the array on set boundaries corresponding to the logical X dimension for the normal mode, and the rotated sets are addressed along a rotated dimension in the array on set boundaries corresponding to the logical Y dimension so that the set boundary in the rotated mode may not match the logical Y dimension and an addressed rotated set may include data outside the logical image size; and wherein the generating means includes:

means, responsive to the logical image size data, for calculating start and stop addresses for the sequences of addresses corresponding to the logical image size; and further including:
means, connected to receive output data from the storing means and responsive to the logical image size, for masking data outside the logical image size in the rotated mode and the opposite rotated mode.

8. The apparatus of claim 4, the control means includes:
control interface means, adapted to receive the control signals, for supplying the control signals to the generating means and wherein the control signals include logical image size data specifying a logical X dimension on set boundaries and a logical Y dimension on line boundaries; and wherein the generating means includes:
means responsive to the logical image size data, for calculating start and stop addresses for the sequences of addresses corresponding to the logical image size.

9. The apparatus of claim 8, wherein the normal sets are addressed along a normal dimension in the array on set boundaries corresponding to the logical X dimension for the normal mode, and the rotated sets are addressed along a rotated dimension in the array on set boundaries corresponding to the logical Y dimension so that the reset boundary in the rotated mode may not match the logical Y dimension and an addressed rotated set may include data outside the logical image size; and further including:
means, connected to receive output data from the storing means and responsive to the logical image size, for masking data outside the logical image size in the rotated mode.

10. The apparats of claim 8, wherein the control signals include s clip signal, and the control means further includes:
means, responsive to the clip signal, for saving the logical Y dimension a current address in a sequence of addresses being generated; and the generating means includes
means, responsive to the clip signal, for specifying a start address in response to the saved logical Y dimension.

11. The apparatus of claim 5, wherein the normal sets are addressed along a normal dimension on set boundaries in the array corresponding to a logical X dimension for the normal mode, and the rotated sets are addressed along a rotated dimension on set boundaries in the array corresponding to a logical Y dimension and the control means includes:
means responsive to a cascade token signal at a first input, for enabling the generating means; and
means, having first and second outputs adapted to connect with others of the apparatus connected in cascade in the logical X dimension and the logical Y dimension, for supplying the cascade token signal in the logical X dimension at the first output and in logical Y dimension at the second output..

12. An integrated circuit apparatus, receiving words of bit map input data defining an image having an input orientation and supplying words of bit map output data defining the image rotated according to a secreted output orientation, comprising:
storing means, connected to receive the input data array addresses, for storing the input data, the storing means including an array of data locations storing receptive units of the input data, the data locations being accessible in a normal mode and a rotated mode, the normal mode accessing normal sets of data locations in response to array addresses and the rotated mode accessing rotated sets of data locations in response to array addresses, wherein the normal sets of data locations store the input data words and the rotated sets of data locations store rotated words defining the image with a rotated orientation wand wherein the array includes at least R+1 normal sets, and a normal set includes a word of data having N+1 units, $NU_n$, for n equal to 0 through N, and a rotated set includes a word of data having R+1 units, where a given rotated set includes one unit $NU_n$, from each of R+1 normal sets;

control means, connected to the generating means, for supplying control signals;

generating means, connected to the control means and responsive to the control signals, for generating sequences of array addresses in the normal mode and the rotated mode and supplying the generated sequences of array addresses to the storage means, the normal mode generating sequences of array addresses for accessing sequences of normal sets of data locations and the rotated mode generating sequences of array addresses for accessing sequences of rotated sets of data locations.

13. The apparatus of claim 12, the control means includes:

control interface means, adapted to receive the control signals, for supplying the control signals to the generating means and wherein the control signals include logical image size data specifying a logical X dimension on set boundaries and a logical Y dimension on line boundaries; and wherein the generating means includes:

means, responsive to the logical image size data, for calculating start and stop addresses for the sequences of addresses corresponding to the logical image size.

14. The apparatus of claim 13, wherein the normal sets are addressed along a normal dimension in the array on set boundaries corresponding to the logical X dimension for the normal mode, and the rotates sets are addressed along a rotated dimension in the array on set boundaries corresponding to the logical Y dimension so that the set boundary in the rotated mode may not match the logical Y dimension and an addressed rotated set may include data outside the logical image size; and further including:

means, connected to receive output data from the storing means and responsive to the logical image size, for masking data outside the logical image size in the rotated mode.

15. The apparatus of claim 3, wherein:

the generating means further includes means for generating sequences of array addresses in an opposite normal mode and an opposite rotated mode, the opposite normal mode generating sequences of addresses for accessing the normal sets and the opposite rotated mode generating sequences of array addresses for accessing the rotated sets; and the sequences of array addresses generated in the normal mode access the storing means according to the normal orientation, the sequences of array addresses generated in the rotated mode access the storing means according to the 90 degree rotated orientation, the sequences of array addresses generated in the opposite normal mode access the storing means according to a 180 degree rotated orientation, and the sequences of array addresses generated in the opposite rotated mode access the storing means according to a 270 degree rotated orientation.

16. The apparatus of claim 15, the control means includes:

control interface mean adapted to receive the control signals, for supplying the control signal to the generating means and wherein the control signals include logical image size data specifying a logical X dimension on set boundaries and a logical Y dimension on line boundaries wherein normal sets are addressed along a normal dimension in the array onset boundaries corresponding to the logical X dimension for the normal mode, and the rotated sets are addressed along a rotated dimension in the array on set boundaries corresponding to the logical Y dimension so that the set boundary in the rotated mode may not match the logical Y dimension and an addressed rotated set may include data outside the logical image size; and wherein the generating means includes:

means, responsive to the logical image size data, for calculating start and stop addresses for the sequences of addresses corresponding to the logical image size; and further including:

means, connected to receive output data from the storing means and responsive to the logical image size, for masking data outside the logical image size in the rotated mode and the opposite rotated mode.

17. The apparatus of claim 13, wherein the control signals include a clip signal, and the control means further includes:

means, responsive to the clip signal, for saving the logical Y dimension of a current address in a sequence of addresses being generated; and the generating means includes means, responsive to the clip signal, for specifying a start address in response to the saved logical Y dimension.

18. The apparatus of claim 12, wherein the normal sets are addressed along a normal dimension on set boundaries in the array corresponding to a logical X dimension for ht normal mode, and the rotated uses are addressed along a rotated dimension on set boundaries in the array corresponding to a logical Y dimension and the control means includes:

means, having a first input responsive to a cascade then signal at the first input, for enabling the generating means; and means, having first and second outputs adapted to connect with others of the apparatus connected in cascade in the logical X dimension and the logical Y dimension, for supplying the cascade token signal in the logical X dimension at the first output and in the logical Y dimension at the second output.

19. An apparatus comprising:

storing means, having a first output port and a second output port, for storing data, the storing means including an array of data locations storing respective units of the data, the data locations being accessible through the first output port and the second output port, the first output port accessing normal sets of data locations in response to array addresses, and the second output port accessing rotated sets of data locations in response to array addresses, wherein the array includes at least $R+1$ normal sets, and a normal set includes a word of data having $N+1$ units, $NU_n$, for n equal to 0 through N, and a rotated set includes award of data having $R+1$ units, where a given rotated set includes one unit $NU_n$, from each of $R+1$ normal sets; and generating means, connected to the storing means, for generating sequences of array addresses for accessing the data through the first output port and the second output sort.

20. The apparatus of claim 19, further including:

control means, connected to the storing means and the generating means, for supplying one or more mode control signals identifying a normal mode and a rotated mode; and wherein a sequence of array addresses generated in the normal mode accesses the array of data locations through the first output port, and a sequence of array addresses generated in the rotated mode accesses the array of data locations through the second output port.

21. The apparatus of claim 20, wherein said control means further includes a means for generating one or more mode control signals identifying an opposite normal mode and an opposite rotated mode; and said apparatus further includes, means connected to the first output port, the second output port and the control means for transposing the normal sets of data locations in the opposite normal mode, and transposing the rotated sets of data locations in the opposite rotated mode.

22. The apparatus of claim 20, wherein the normal sets are accessed along a normal dimension on set boundaries in the array corresponding to a logical X dimension for the normal mode, and the rotated sets are addressed along a rotated dimension on set boundaries int eh array corresponding to a logical Y dimension, and the control means includes:

means, having a first input connected to receive a cascade token signal, for enabling the generating means in response to the cascade token signal; and means, having first and second outputs adapted to connect with others of the apparatus connected in cascade in the logical X dimension and the logical Y dimension, for supplying the cascade token on the logical X dimension at the first output, and in the logical Y dimension at the second output in response to control signals and the cascade token signal.

23. The apparatus of claim 20, wherein the data stored in the array of data locations is a bit map of an image having a portrait orientation and the normal sets store units of data in the bit map according to the portrait orientation, and the rotated sets store units of data in thebit map according to a landscape orientation.

* * * * *